United States Patent
Suzuki et al.

(10) Patent No.: US 10,948,983 B2
(45) Date of Patent: Mar. 16, 2021

(54) SYSTEM AND METHOD FOR UTILIZING GAZE TRACKING AND FOCAL POINT TRACKING

(71) Applicant: Samsung Electronics Co., Ltd., Suwon-si (KR)

(72) Inventors: Masaki Suzuki, Sunnyvale, CA (US); Sergio Perdices-Gonzalez, Sunnyvale, CA (US); Pranav Mistry, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/129,257

(22) Filed: Sep. 12, 2018

(65) Prior Publication Data
US 2019/0294239 A1    Sep. 26, 2019

Related U.S. Application Data

(60) Provisional application No. 62/645,972, filed on Mar. 21, 2018.

(51) Int. Cl.
G06F 3/01 (2006.01)
H04N 5/232 (2006.01)
G02B 27/01 (2006.01)

(52) U.S. Cl.
CPC ........... *G06F 3/013* (2013.01); *G02B 27/017* (2013.01); *G02B 27/0179* (2013.01); *H04N 5/232127* (2018.08); *G02B 2027/0187* (2013.01)

(58) Field of Classification Search
CPC . G06F 3/013; G06T 11/06; G02B 2027/0185; G02B 3/14
See application file for complete search history.

(56) References Cited

U.S. PATENT DOCUMENTS

| | | | | |
|---|---|---|---|---|
| 8,913,004 | B1* | 12/2014 | Bozarth | G06K 9/00604 345/156 |
| 9,922,651 | B1 | 3/2018 | Nelson et al. | |
| 2012/0307208 | A1 | 12/2012 | Trousdale | |
| 2013/0300635 | A1 | 11/2013 | White et al. | |
| 2014/0292639 | A1* | 10/2014 | Kamhi | G06F 3/012 345/156 |
| 2014/0313120 | A1 | 10/2014 | Kamhi | |
| 2015/0187115 | A1* | 7/2015 | MacDonald | G06F 3/013 345/419 |
| 2016/0050391 | A1* | 2/2016 | Schultz | H04N 7/144 348/14.07 |

(Continued)

OTHER PUBLICATIONS

ISA/KR, "International Search Report and Written Opinion of the International Searching Authority," International Application No. PCT/KR2019/003289, dated Jun. 28, 2019, 9 pages.

(Continued)

*Primary Examiner* — Kevin M Nguyen

(57) ABSTRACT

A system and method enable an electronic device to perform gaze or focal tracking operations. The electronic device includes a processor and a display screen. The processor is configured to in response to determining at least one of: a gaze of the user or a focal point of the eye of the user, control at least one of: an operation of the electronic device, or a focal point of an adjustable lens. The display screen is coupled to the processor, and configured to present an image of an object based on at least one of the gaze of the user or the focal point of the eye.

24 Claims, 14 Drawing Sheets

FIGURE 6

(56) References Cited

U.S. PATENT DOCUMENTS

| | | | |
|---|---|---|---|
| 2016/0174912 A1* | 6/2016 | Cronin | A61B 5/746 |
| | | | 702/19 |
| 2016/0295202 A1* | 10/2016 | Evans | G02B 3/14 |
| 2017/0123233 A1 | 5/2017 | Sabovic et al. | |
| 2017/0142329 A1 | 5/2017 | Pelz | |
| 2017/0160799 A1 | 6/2017 | Shi | |
| 2017/0344108 A1* | 11/2017 | Mosqueda Mejia | G06F 3/013 |
| 2018/0003991 A1* | 1/2018 | Guillaumee | G02B 27/0179 |
| 2018/0096503 A1* | 4/2018 | Kaehler | G02B 27/0172 |
| 2018/0299683 A1* | 10/2018 | Ohashi | G09G 3/003 |
| 2020/0004327 A1* | 1/2020 | Wang | G06F 3/013 |

OTHER PUBLICATIONS

Jacob, "Eye Movement-Based Human-Computer Interaction Techniques: Toward Non-Command Interfaces", Apr. 1, 1991, 58 pages.

Hollomon et al., "Current Status of Gaze Control Research and Technology Literature Review", Jan. 2017, 38 pages.

Jacob, "Eye Tracking in Advanced Interface Design", Dec. 31, 1995, 53 pages.

Jacob, "The Use of Eye Movements in Human-Computer Interaction Techniques: What You Look At is What You Get", ACM Transactions on Information Systems, vol. 9, No. 3, Apr. 1991, 18 pages.

Majaranta et al., Twenty Years of Eye Typing: Systems and Design Issues, Mar. 25, 2002. 8 pages.

Supplementary European Search Report dated Dec. 22, 2020 in connection with European Patent Application No. 19 772 085.7, 10 pages.

\* cited by examiner

SYSTEM AND METHOD FOR UTILIZING GAZE TRACKING AND FOCAL POINT TRACKING

CROSS-REFERENCE TO RELATED APPLICATION(S) AND CLAIM OF PRIORITY

This application claims priority under 35 U.S.C. § 119(e) to U.S. Provisional Patent Application No. 62/645,972 filed on Mar. 21, 2018 and entitled "DETERMINING GAZE AND EYE FOCAL POINT IN A HEAD MOUNTED DEVICE". The above-identified provisional patent application is hereby incorporated by reference in its entirety.

TECHNICAL FIELD

This disclosure relates generally to optical display systems. More specifically, this disclosure relates to controlling a display system based on information from focal point tracking or gaze tracking, or a combination thereof.

BACKGROUND

Augmented reality (AR) glasses are a growing market. Current AR glasses only project the content at a fixed distance (usually infinity). Even though there are optical methods to change the focal plane, suitable methods and systems to track the user focal distance in a portable head-mounted AR system do not exist. That is, a current optical head-mounted display draws information at a fixed distance, while a user's focal distance varies. Therefore, if the eye does not focus at the focal distance, images will blur and may produce dizziness.

SUMMARY

This disclosure provides a system and method for controlling a display system based on information from focal point tracking or gaze tracking, or both, such as for use a head mounted display system.

In a first embodiment, an electronic device is provided. The electronic device includes a processor and a display screen. The processor is configured to in response to determining at least one of: a gaze of the user or a focal point of the eye of the user, control at least one of: an operation of the electronic device, or a focal point of an adjustable lens. The display screen is coupled to the processor, and configured to present an image of an object based on at least one of the gaze of the user or the focal point of the eye.

In a second embodiment, a method is provided. The method includes, in response to determining at least one of: a gaze of the user or a focal point of the eye of the user, controlling at least one of: an operation of the electronic device, or a focal point of an adjustable lens. The method also includes presenting an image of an object based on at least one of the gaze of the user or the focal point of the eye.

In a third embodiment, a non-transitory computer readable medium configured to store a plurality of instructions is provided. The plurality of instructions, when executed by at least one processor, are configured to cause the at least one processor to, in response to determining at least one of: a gaze of the user or a focal point of the eye of the user, control at least one of: an operation of the electronic device, or a focal point of an adjustable lens; and control a display screen to present an image of an object based on at least one of the gaze of the user or the focal point of the eye.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 19, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
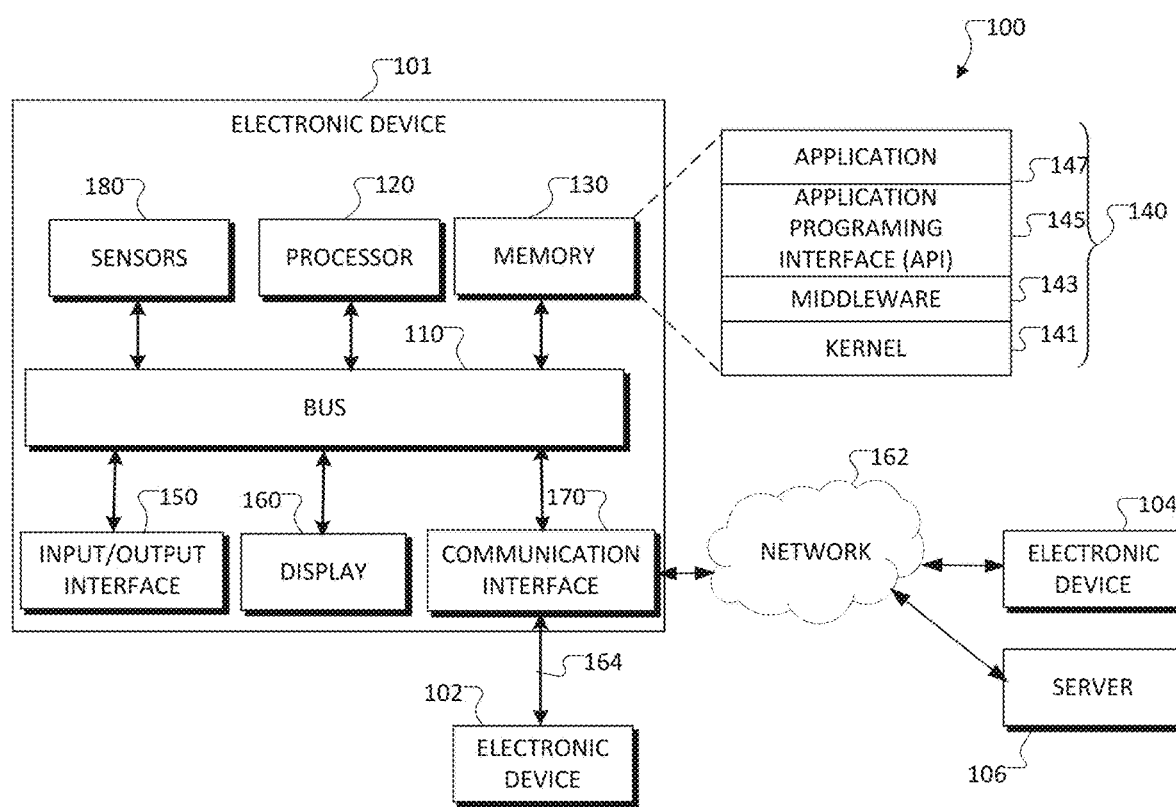
FIG. 1 illustrates an example of a network configuration according to an embodiment of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The first external electronic device 102 or the second external electronic device 104 can be a wearable device or an electronic device 101-mountable wearable device (e.g., an optical head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in an augmented reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 101 is mounted in a wearable device (e.g., the electronic device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process. Additional information on the event processing module 185 may be provided through FIG. 2 described below.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
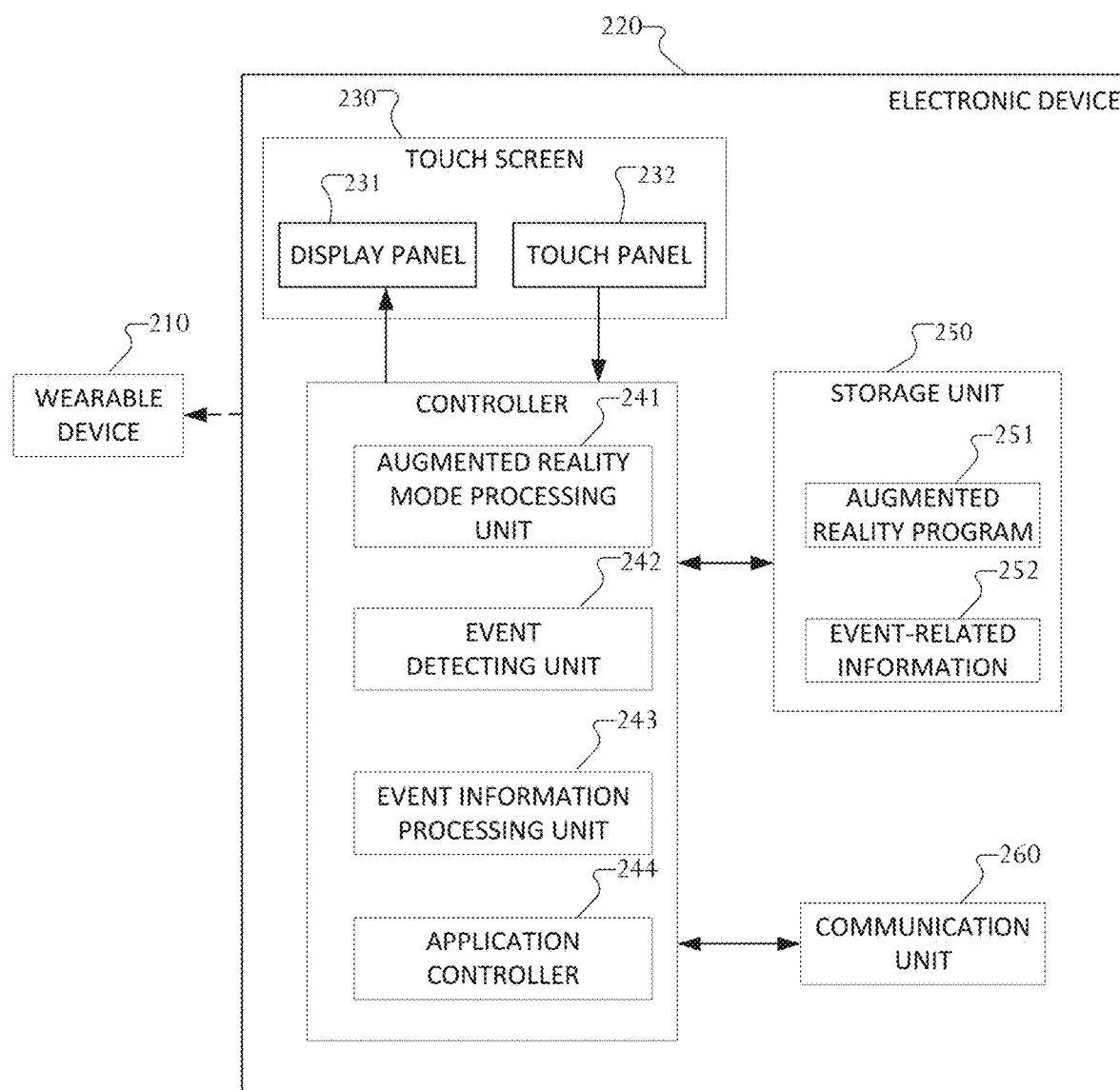
FIG. 2 is a block diagram of an example configuration of an electronic device according to an embodiment of this disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

For example, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG. 1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected with a wearable device, the controller can perform control to run the augmented reality mode. According to certain embodiments, the controller can enable the event-related information to be arranged and processed to be displayed in a three dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360 degree cameras, or a combination thereof.

Figure 3:
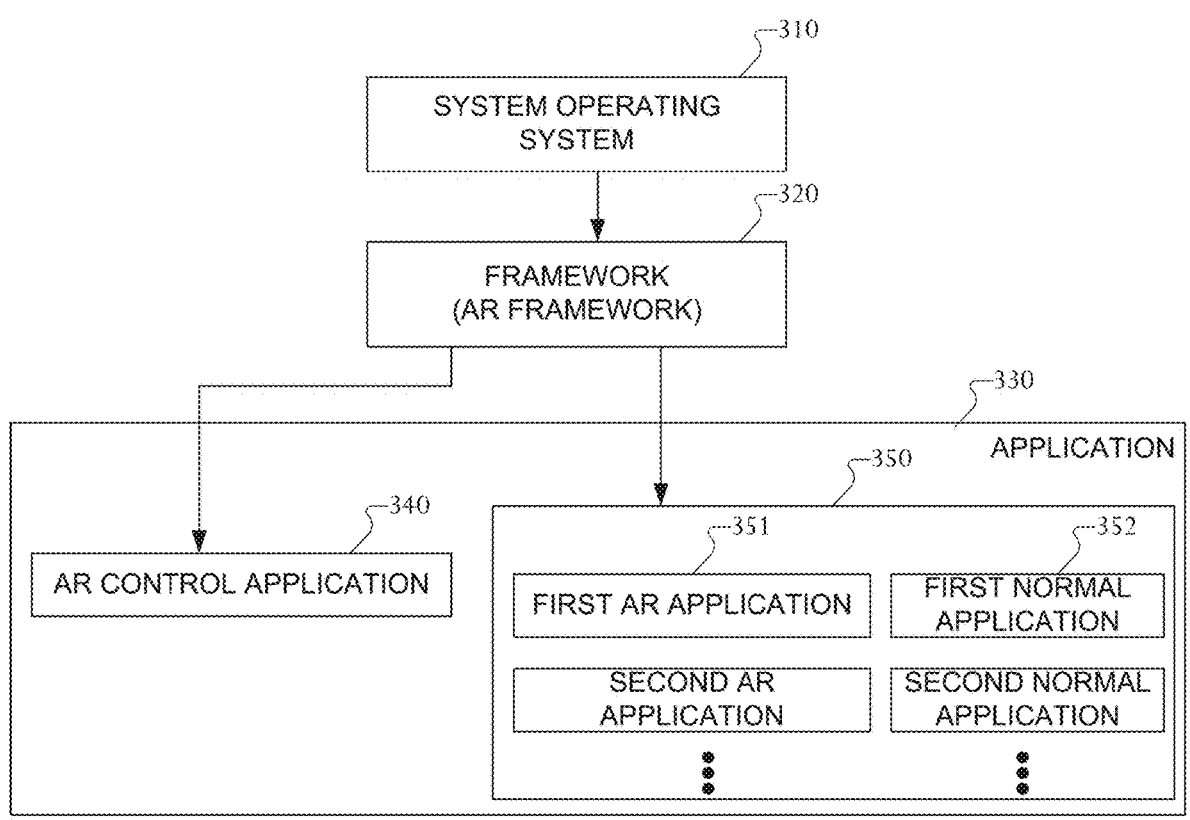
FIG. 3 is a block diagram that illustrates a program module according to an embodiment of this disclosure.
Figure 4A:
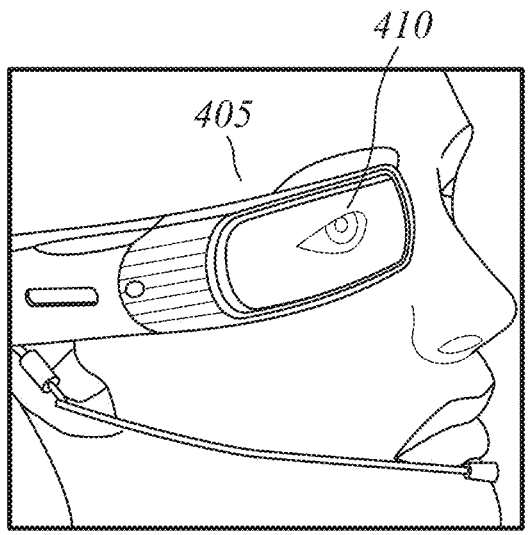
FIGS. 4A, 4B, 4C, and 4D illustrate examples of a head mounted display (HMD) for use in augmented reality, mixed reality, or virtual reality according to an embodiment of this disclosure.
Figure 4B:
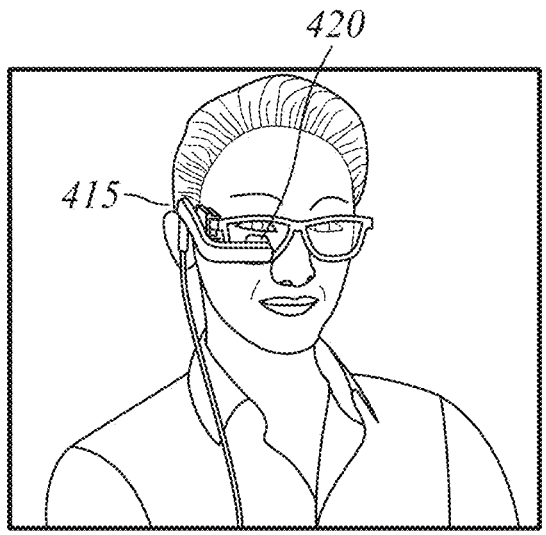
Figure 4C:
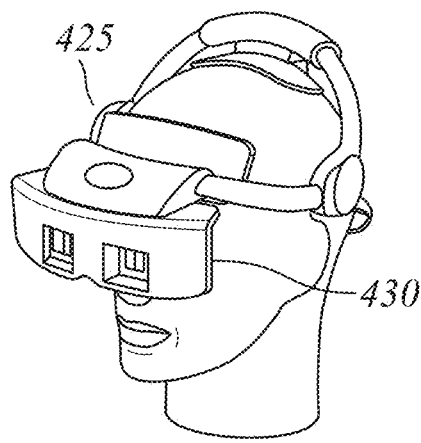
Figure 4D:
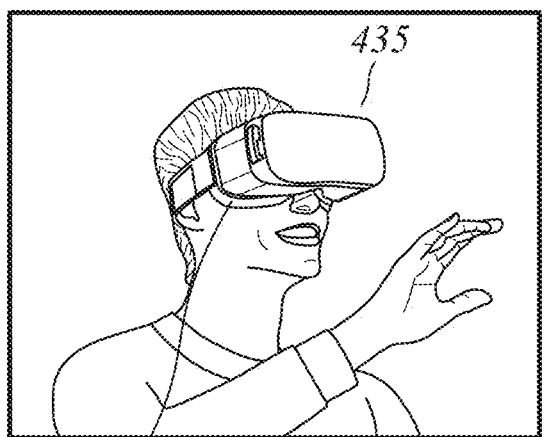

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to a virtual reality (VR) and the augmented reality (AR). Referring to FIG. 3, the program module can include a system operating system (e.g., an OS) 310, a framework 320, and an application(s) 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a Bluetooth driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application(s) 330 can include a plurality of applications and can include at least one AR application 351 running in the augmented-reality mode and at least one normal application 352 running in a non-augmented-reality mode.

The application(s) 330 can further include an AR control application 340. An operation of the at least one AR application 351 and/or at least one normal application 352 can be controlled by the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates in the background so as not to influence the screen used by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIG. 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In-world elements are elements that move in relation to the real or virtual environment itself (i.e., move in relation to the environment itself). Depending on the object, in-world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

FIGS. 4A, 4B, 4C, and 4D illustrate examples of a head mounted display (HMD) for use in augmented reality, mixed reality, or virtual reality according to an embodiment of this disclosure. The embodiments of the HMDs shown in FIGS. 4A-4D are for illustration only and other configurations could be used without departing from the scope of the present disclosure.

The HMD can generate an augmented reality environment in which a real-world environment is rendered with augmented information. The HMD can be monocular or binocular and can be an opaque, transparent, semi-transparent or reflective device. For example, the HMD can be a monocular electronic device 405 having a transparent screen 410. A user is able to see through the screen 410 as well as able to see images rendered, projected or displayed on the screen 410. The images may be projected onto the screen 410, generated or rendered by the screen 410 or reflected on the screen 410. In certain embodiments, the HMD is a monocular electronic device 415 having an opaque or non-see through display 420. The non-see through display 420 can be a liquid crystal display (LCD), a Light emitting diode (LED), active-matrix organic light emitting diode (AMOLED), or the like. The non-see through display 420 can be configured to render images for viewing by the user. In certain embodiments, the HMD can be a binocular electronic device 425 having a transparent screen 430. The transparent screen 430 can be a single contiguous screen, such as adapted to be viewed by, or traverse across, both eyes of the user. The transparent screen 430 also can be two transparent screens in when one screen is disposed corresponding to a respective eye of the user. The user is able to see through the screen 430 as well as able to see images rendered, projected or displayed on the screen 430. The images may be projected onto the screen 430, generated or rendered by the screen 430 or reflected on the screen 430. In certain embodiments, the HMD is a binocular electronic device 435 having an opaque or non-see through display 440. The HMD can include a camera or camera input configured to capture real-world information and display, via the non-see through display 440, real-world information. The non-see through display 440 can be an LCD, LED, AMOLED, or the like. The non-see through display 440 can be configured to render images for viewing by the user. The real-world information captured by the camera can be rendered as a video image on the display with augmented information.

Embodiments of the present disclosure utilize focal point tracking, such as disclosed in U.S. patent application Ser. No. 16/128,322, filed on Sep. 11, 2018, naming Masak Suzuki, Sergio Perdices-Gonzalez, and Pranav Mistry as inventors, and entitled "SYSTEM AND METHOD FOR TRACKING A FOCAL POINT FOR A HEAD MOUNTED DEVICE". The contents of U.S. patent application Ser. No. 16/128,322 are incorporated herein by reference in their entirety.

Embodiments of the present disclosure relate to focal point tracking or gaze tracking, or both, for use in augmented reality (AR) systems. In the recent years, a significant increase in interest in Augmented Reality (AR) glasses has been experienced. Because a see-through AR HMD is compact and lightweight, demand is expected to continue and increase. A significant issue with the current technology is that AR HMDs may draw an extremely blurred image in some cases. The blurred image may cause nausea, dizziness or generally ill feelings in the user of the HMD. Additionally, gaze too long at an electronic display can cause vision concerns.

Embodiments of the present disclosure provide a system and method that can determine a coordinate, such as an X,Y position, to which a user is looking, and in conjunction with a focal point of the eye of the user, the real depth of the object (distance from user eye to the object). Embodiments of the present disclosure enable the processing circuitry to distinguish what object is the user looking at when there are multiple objects in the same line of sight at different distances.

Figure 5:
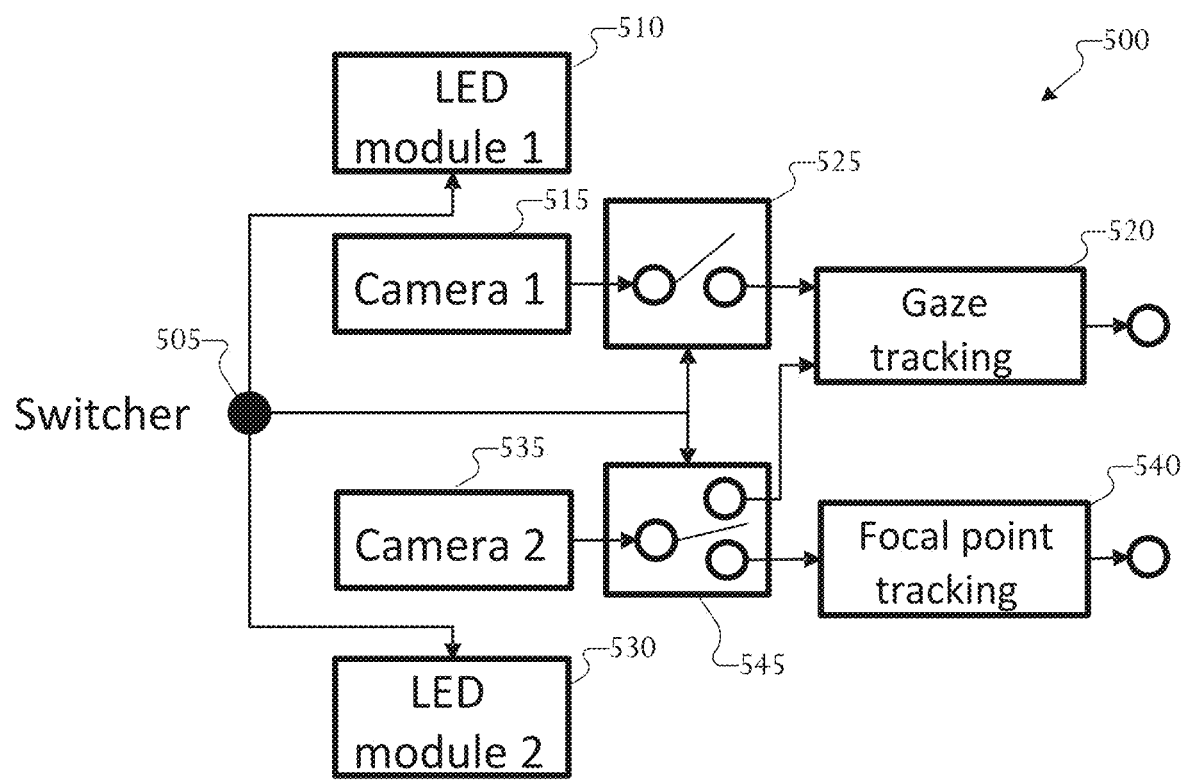
FIG. 5 illustrates an electronic device having focal point tracking circuitry and gaze tracking circuitry according to embodiments of the present disclosure.

FIG. 5 illustrates an electronic device having focal point tracking circuitry and gaze tracking circuitry according to embodiments of the present disclosure. The embodiment of the electronic device shown in FIG. 5 is for explanation only and other illustrations could be used without departing from the scope of the present disclosure. The electronic device 500 can be the same as, or similar to, one of the electronic devices 101, 102, 104, 210 or 220.

In certain embodiments, the electronic device 500 includes modules, or circuitry, for focal point tracking and circuitry for gaze tracking. A switch 505, which can be an adaptive switch, is configured to switch between the focal point tracking circuitry and gaze tracking circuitry.

The gaze tracking circuitry can include a light emitting diode (LED) circuit 510 and a first camera 515, which is coupled to a gaze tracking processor 520 through a first switch 525. The first switch 525 can be configured to be responsive to commands from the switch 505 or included in the switch 505.

The focal point tracking circuitry can include an LED circuit 530 and a second camera 535, which is coupled to a focal point tracking processor 540 through a first switch 545. The first switch 525 can be configured to be responsive to commands from the switch 505 or included in the switch 505.

The gaze tracking processor 520 and the focal point tracking processor 540 each are able to drive images on a display unit. For example, the gaze tracking processor 520 can be used, at least in part, to operate one or more displays in response to gaze tracking functions outlined herein. Alternatively, the focal point tracking processor 540 can be used, at least in part, to vary focal points of objects rendered on the display based on a determined focal point of the eye of the user.

Figure 6:
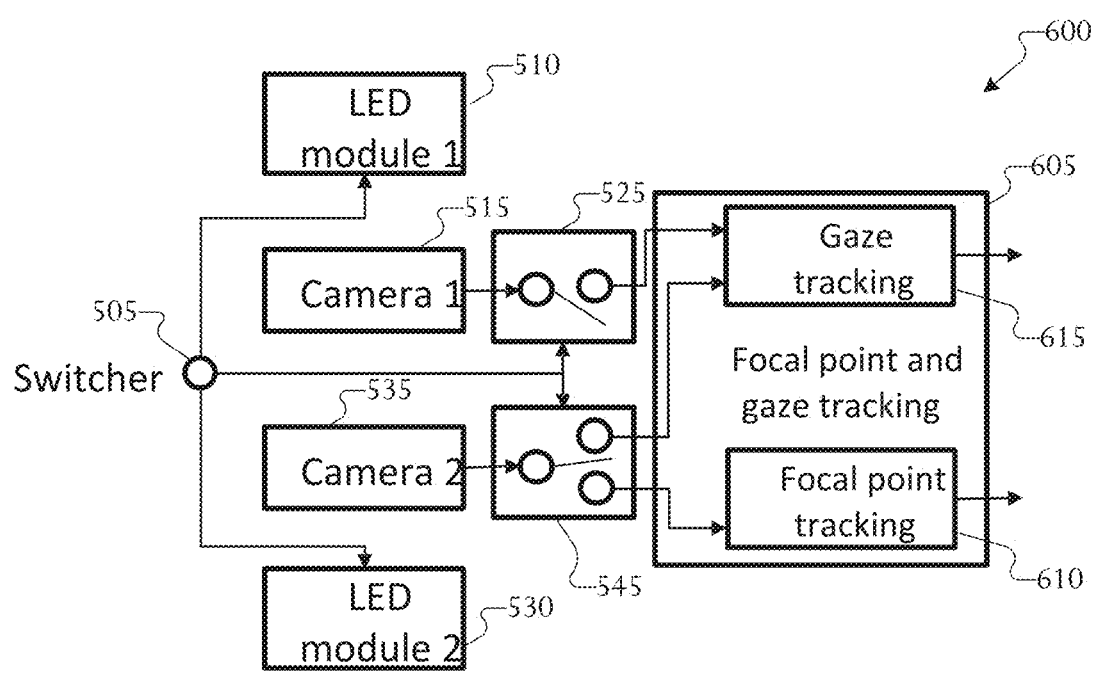
FIG. 6 illustrates an electronic device having circuitry for focal point tracking and gaze tracking according to embodiments of the present disclosure.

FIG. 6 illustrates an electronic device having circuitry for focal point tracking and gaze tracking according to embodiments of the present disclosure. The embodiment of the electronic device shown in FIG. 6 is for explanation only and other illustrations could be used without departing from the scope of the present disclosure. The electronic device 600 can be the same as, or similar to, one of the electronic devices 101, 102, 104, 210 or 220.

In certain embodiments, the electronic device 600 includes a processor system 605 configured to perform both focal point tracking and gaze tracking. For example, the processor system 605 can include one or more processors to perform focal point tracking 610 and gaze tracking 615. In certain embodiments, processor system 605 includes a single processor to perform focal point tracking 610 and gaze tracking 615. In certain embodiments, the processor system 605 is configured to control the switch 505 to switch between the focal point tracking circuitry and gaze tracking circuitry.

The gaze tracking circuitry can include a LED circuit 510 and a first camera 515, which is coupled to a gaze tracking processor 520 through a first switch 525. The first switch 525 can be configured to be responsive to commands from the switch 505 or included in the switch 505.

The focal point tracking circuitry can include an LED circuit 530 and a second camera 535, which is coupled to a focal point tracking processor 540 through a first switch 545. The first switch 525 can be configured to be responsive to commands from the switch 505 or included in the switch 505.

The processor system 605 is able to drive images on a display unit. For example, the processor system 605 can operate one or more displays in response to gaze tracking functions outlined herein. Alternatively, the processor system 605 can vary focal points of objects rendered on the display based on a determined focal point of the eye of the user.

Figure 7:
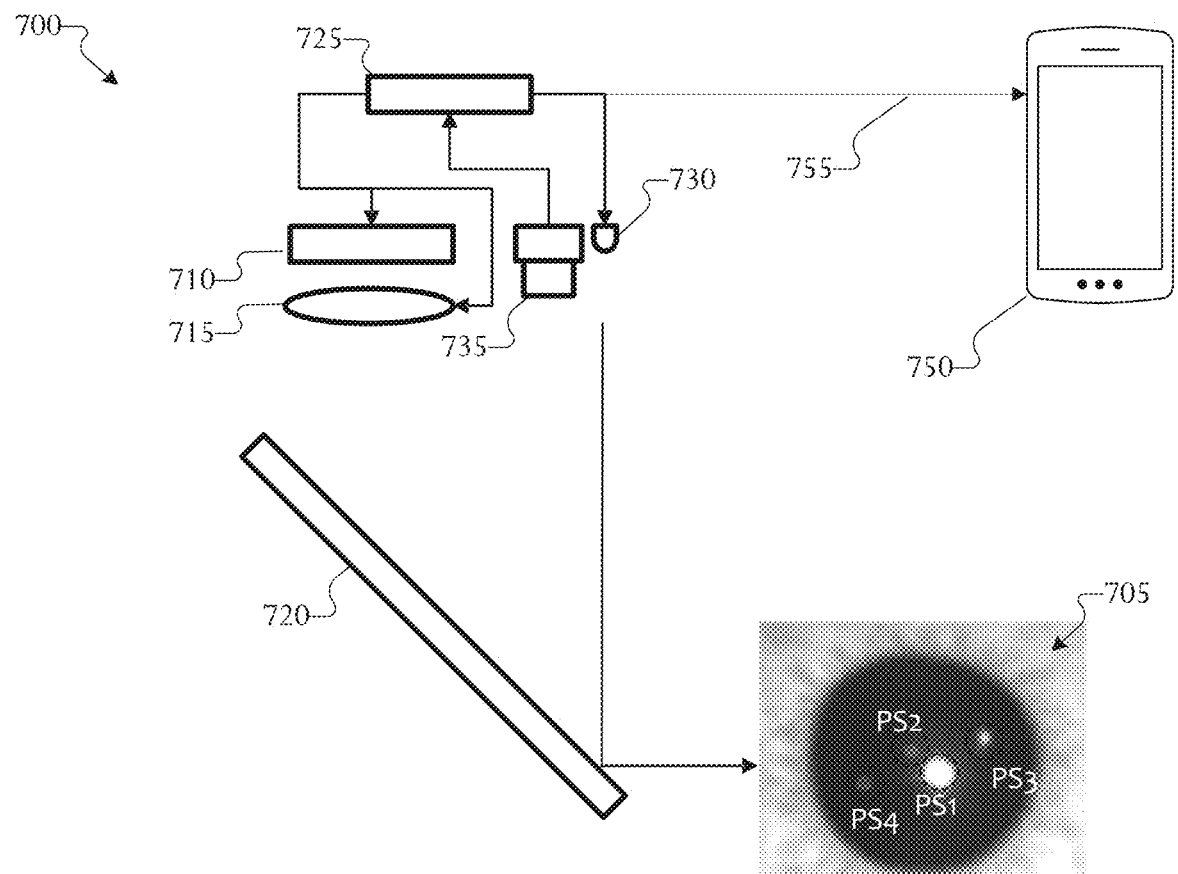
FIG. 7 illustrates a focal point estimation system according to embodiments of the present disclosure.

FIG. 7 illustrates a focal point estimation system according to embodiments of the present disclosure. The embodiment of the focal point estimation system (FPES) 700 is for illustration only and other embodiments could be used without departing from the scope of the present disclosure. The FPES 700 can be used with an HMD. The FPES 700 can be included as a component of an HMD. The FPES 700 can be removably coupled to the HMD. The HMD can be configured as one of the HMD's 405, 415, 425 or 440.

The FPES 700 is positioned in relation to the user's eye 705. The FPES 700 is able to emit a light towards the user's eye 705 and detect a reflected light from the user's eye 705. That is, the FPES 700 can emit a light towards the user's eye 705 while the user, being a wearer of the HMD, is looking at an object placed in front of the HMD, wherein the reflected light is reflected by an anterior surface of the eye of the user and inner lens of the eye of the user. In one example, the FPES includes OLED display 710, a lens assembly 715, a reflective interface 720, a processing system 725, an infrared light source 730, and an infrared camera 735.

The OLED display 710 displays images, such as images to augment a reality view of the user when wearing the HMD. In certain embodiments, the OLED display 710 can be integrated into the FPES 700, such as when the FPES 700 is part of, or comprises, the HMD. In certain embodiments, the OLED display 710 is part of the HMD and interacts with the FPES 700. For example, the FPES 700 can drive command signals to control an image rendered by the OLED display 710 and the OLED display 710 can render images based on estimations performed by the FPES 700. That is, the OLE display is configured to present an image of the object at a 2nd distance based on the focal point of the lens unit to create a perception for the user that the image is placed at the 1st distance.

The lens assembly 715 can include a single lens or a plurality of lenses. The lens assembly 715 can be a part of the OLED display 710 or coupled to the OLED display 710. For example, when the FPES is included with the HMD, the lens assembly 715 can be disposed in proximity to or over a display surface of the OLED display 710. In certain embodiments, when the FPES 700 is coupled to the HMD, the lens assembly 715 may be included as part of the HMD, may be included as part of the OLED display 710, or may be configured to removably couple to the HMD or OLED display 710, such that the lens assembly 715 is disposed in proximity to or over a display surface of the OLED display 710. The lens assembly 715 is configured to adjust to vary a focal point of the lens assembly 715.

The reflective interface 720 is a transparent, semi-transparent, or opaque material. The reflective interface 720 includes a reflective surface. For example, the reflective interface 720 can be a transparent mirror. In certain embodiments, the reflective interface 720 is integrated as part of the FPES 700. In certain embodiments, the reflective interface 720 is part of the HMD 700 to which the FPES 700 is coupled. The reflective interface 720 is configured to reflect light from the infrared light source 730 towards the eye 705 and reflect light from the eye 705 towards the infrared camera 735.

The infrared light source 730 emits an infrared light towards the reflective interface 720. The infrared light is emitted at a radiant intensity sufficiently low to be safe for the eye 705. A standard IEC-62471 describes a safe level of infrared's intensity, for example, a radiant intensity of 0.18 watt per steradian (W/sr). In certain embodiments, the infrared light source 730 emits the infrared light at or below 0.18 W/sr. In certain embodiments, the infrared light source 730 emits the infrared light at or below 0.10 W/sr. In certain embodiments, the infrared light source 730 includes a switcher configured to enable the infrared light source 730 to emit the infrared light at or below 0.01 W/sr. It is noted that a first reflection point PS1 corresponds to light reflected from an anterior (or outer) surface of the cornea; a second reflection point PS2 corresponds to light reflected from an posterior (or inner) surface of the cornea; a third reflection point PS3 corresponds to light reflected from an anterior (or outer) surface of the lens; and fourth reflection point PS2 corresponds to light reflected from an posterior (or inner) surface of the lens. In certain embodiments, the illuminance of the light source 730 is 100% while the illuminance of PS1 is 2.5% with a magnification of 0.072; the illuminance of PS2 is 0.02% with a magnification of 0.06, the illuminance of PS3 is 0.09% with a magnification of 0.086; and the illuminance of PS4 is 0.09% with a magnification of 0.05. It is further noted that the image at PS4 is inverted (i.e., flipped) from the image at the light source.

The infrared camera 735 is configured to capture an image of the eye 705. The infrared camera 735 can detect light reflected from the eye 705. In certain embodiments, the infrared camera 735 can be, or can include, a light sensor configured to detect a reflected light. The reflected light can be reflected by an anterior surface of the eye of the user and inner lens of the eye of the user. The reflected light can be further reflected by reflective interface 720. The infrared camera 735 transmits signals corresponding to the detected or captures images to the processing system 725.

The processing system 725 can include one or more processors configured to control operations of the FPES 700, the HMD, or a combination thereof. The processing system 725 can include a memory to store instructions for operating the processing system 725, operating the FPES 700, operating the HMD, or a combination thereof. The memory also can store data captured by the FPES 700, such as via the infrared camera 735. The processing system 725 receives signals from the infrared camera 735 corresponding to the images of the eye 705. The processing system 725 analyzes a reflected light pattern on the eye 705 and estimates a corresponding focal point for the eye 705. For example, the processing system 725 can estimate a focal point of the eye 705 using a Purkinje-Sanson Image estimation method. The processing system 725 analyzes a reflection pattern in the image of the eye 705 as captured by infrared camera 735. The processing system 725 identifies reflection points corresponding to the reflection point PS1, the second reflection point PS2, the third reflection point PS3 and the fourth, inverted reflection point PS4. It is again noted that the first reflection point PS1 corresponds to light reflected from an anterior (or outer) surface of the cornea; the second reflection point PS2 corresponds to light reflected from an posterior (or inner) surface of the cornea; the third reflection point PS3 corresponds to light reflected from an anterior (or outer) surface of the lens; and the fourth reflection point PS2 corresponds to light reflected from an posterior (or inner) surface of the lens. The processing system 725 calculates, measures, or otherwise determines a distance between PS1 and PS3. The measurements vary based on eye rotation and an anterior surface curvature of the eye of the user and the inner lens of the eye of the user while the user is looking at the object. Based on the distance determination, the processing system 725 adjusts a focal point of the lens assembly 715. As such, the processing system 725 is configured to adjust the focal point of the lens unit in response to a 1st distance of the object from the HMD, wherein the 1st distance is determined based on position of the reflected light.

In response to the adjustment of the focal point of the lens assembly 715, the OLED display 710 is able to present an image of an object at a second distance based on the focal point of the lens assembly 715. Therefore, the FPES 700 is able to create a perception for the user that the image is at a first distance, which is different than the second distance.

In certain embodiments, the FPES 700 is configured to adjust for different interpupillary distance (IPD). The FPES 700 can automatically, i.e., without user intervention, mechanically move an illumination LED using camera feedback loop to initially adjust and track user changes in HMD positioning during use and to adjust for different eye positions for different users. The FPES 700 can automatically, i.e., without user intervention, mechanically move the half-mirror (reflective interface 720), using camera feedback loop to initially adjust and track user changes in HMD positioning during use and to adjust for different eye positions for different users. In certain embodiments, the FPES 700 includes a Multi-LED: array (1D) or matrix (2D). The FPES 700 can perform feedback loop testing of different LED's and camera tracking of PS3 635. The FPES 700 can perform feedback loop optimization for once it is locked at the optimal LED can skip the loop or just track neighbor LEDs. In certain embodiments, the FPES 700 is configured to initially calibrate to a respective user and, thereafter, adjust a focal point based on user eye movements and adjustments in focus. In certain embodiments, the FPES 700 is configured to recalibrate in response to HMD movements of the user. Additionally or alternatively, in certain embodiments, the FPES 700 can be configured to adjust for different interpupillary distances (IPDs) based on manual user input/adjustment. In certain embodiments, feedback for the manual user input/adjustment can be provided to the user visually, haptically, and/or acoustically, etc.

In certain embodiments, the FPES 700 is configured to communicate with an external device. For example, the FPES 700 can be connected to a smartphone 750 to provide focal point estimation or gaze point tracking in conjunction with functionality in the smartphone 750. The FPES 700 can provide notifications, graphs or data, or health monitoring information 755 to the user via the smartphone 750.

Figure 8:
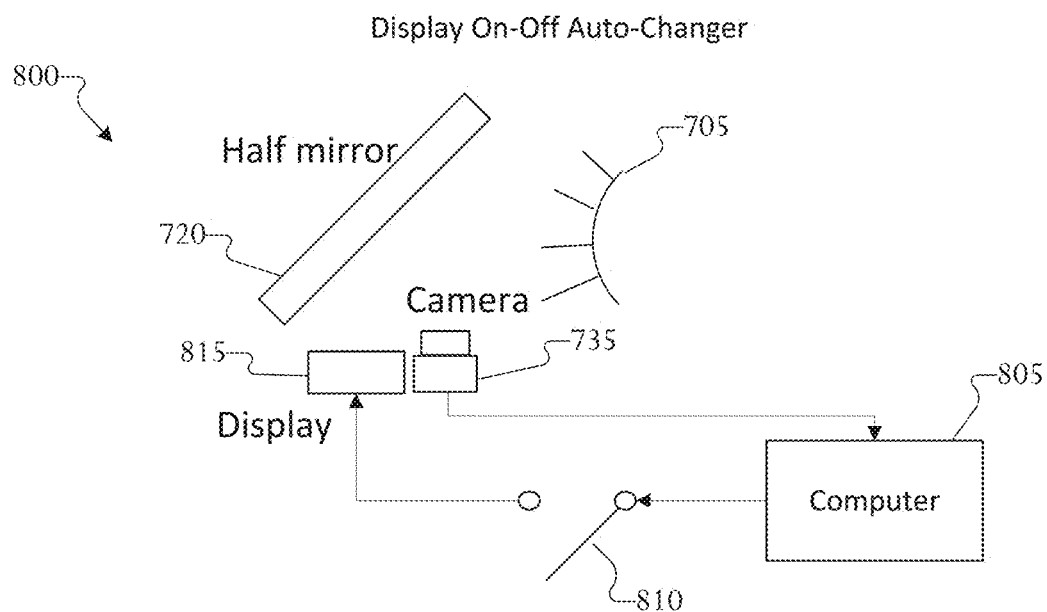
FIG. 8 illustrates an electronic device having a display on-off auto changer according to embodiments of the present disclosure.

FIG. 8 illustrates an electronic device having a display on-off auto changer (DAC) according to embodiments of the present disclosure. The embodiment of the extended reality electronic device shown in FIG. 8 is for explanation only and other illustrations could be used without departing from the scope of the present disclosure. In certain extended reality electronic device 800 is configured to create an augmented reality experience for the user. In certain extended reality electronic device 800 is configured to create a virtual reality experience for the user. The electronic device 800 can be the same as, or similar to, one of the electronic devices 101, 102, 104, 210 or 220 and can include circuitry as described with respect to electronic device 500, electronic device 600 or FPES 700.

The electronic device 800 is positioned in relation to the user's eye 705. The electronic device 800 is able to determine a user's gaze and focal point. The electronic device 800 includes a processor 805 configured to perform gaze tracking, focal point tracking, or a combination thereof. The electronic device 800 also includes an adaptive switch 810 configured to operate to control command signals from the processor 805 to the display 815. In certain embodiments, the adaptive switch 810 includes processing circuitry configured to operate in response to determinations regarding the gaze of the user. In certain embodiments, the adaptive switch 810 operates in response to command signals received from the processor 805.

Figure 11:
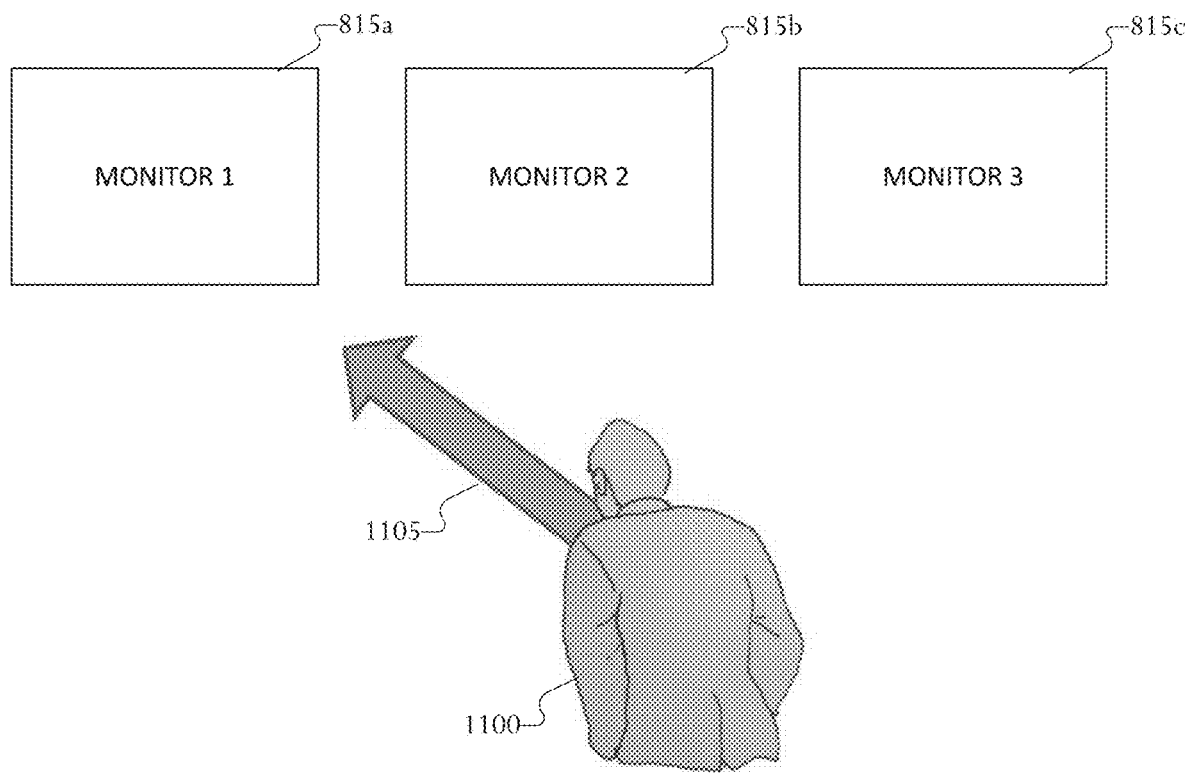
FIGS. 11, 12, and 13 illustrate operation of external devices according to embodiments of the present disclosure.

In certain embodiments, the display 815 is included in the electronic device. For example, the display 815 can be OLED display 710. In certain embodiments, the display 815 is a display on an external device. For example, the display 815 can be multiple displays on different external devices, as shown in FIG. 11, such that the adaptive switch 810 engages different displays on different devices in response to command signals received from the processor 805.

The adaptive switch 810 operates the display 815 as a function of the gaze of the user. When the electronic device 800 determines that the user is looking at a near object, such as at the display 815, the adaptive switch 810 turns the display 815 ON. When the electronic device 800 determines that the user is looking at a far object, that is, that the gaze of the user is beyond a predetermined threshold distance, the adaptive switch 810 turns the display 815 OFF. Persons of ordinary skill in the art will recognize that, in the ON state, the display 815 is able to render images or video as a function of the process being executed, while, in the OFF state, the display 815 is functionally off such that no power is flowing to the display screen or the display 815 receives no images, data, or video for rendering on the display screen.

Figure 9:
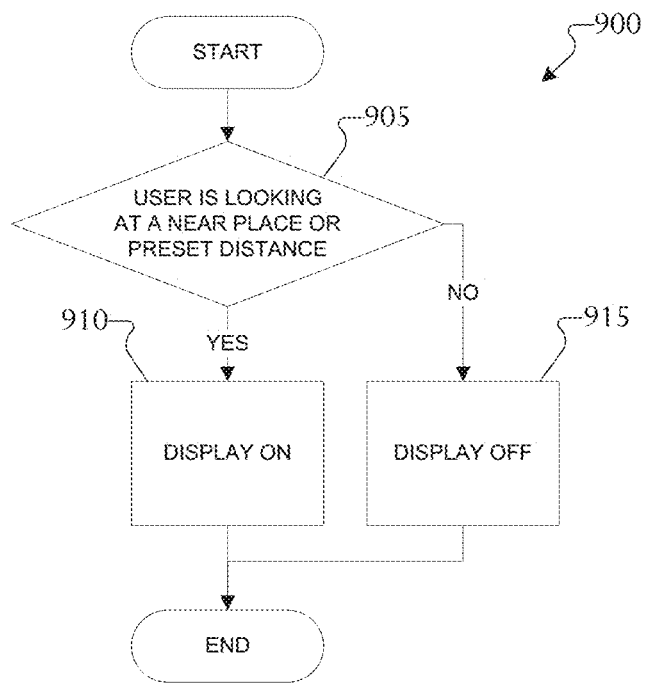
FIG. 9 illustrates a display auto-ON/auto-OFF process according to embodiments of the present disclosure.

FIG. 9 illustrates a display auto-ON/auto-OFF process according to embodiments of the present disclosure. FIG. 9 does not limit the scope of this disclosure to any particular embodiments. While the auto-ON/auto-OFF process 900 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the auto-ON/auto-OFF process 900 is described with respect to processing system 805 of the electronic device 800 of FIG. 8. However, the auto-ON/auto-OFF process 900 can be used with any other suitable system.

In block 905, a determination is made as to whether the user is looking at a near object, such as at the display 815. For example, the processor 805 can determine whether a gaze, or focal point, or both, of the eye of the user is at a distance corresponding to a position of the display 815.

When the gaze or focal point of the eye of the user corresponds to a near proximity, such as at the distance corresponding to a position of the display 815, the display 815 is turned ON in block 910. For example, in response to the processor 805 determining that the gaze of the eye of the user corresponds to the distance corresponding to the position of the display 815, the processor 805 causes the adaptive switch to turn ON the display 815. In certain embodiments, the adaptive switch 810 operates automatically, namely without user intervention, in response to the determination that the gaze of the eye of the user corresponds to the distance corresponding to the position of the display 815. For example, the adaptive switch 810 can detect a flag or condition state in the processor 805 when the processor 805 determines the gaze of the eye of the user.

When the gaze or focal point of the eye of the user does not correspond to a near proximity, such as at the distance exceeding a preset or predetermined distance, which could correspond to a distance of the display 815, the display 815 is turned OFF in block 915. For example, in response to the processor 805 determining that the gaze of the eye of the user exceeds the preset or predetermined distance, the processor 805 causes the adaptive switch to turn OFF the display 815. In certain embodiments, the adaptive switch 810 operates automatically, namely without user intervention, in response to the determination that the gaze of the eye of the user exceeds the preset or predetermined distance.

Figure 10:
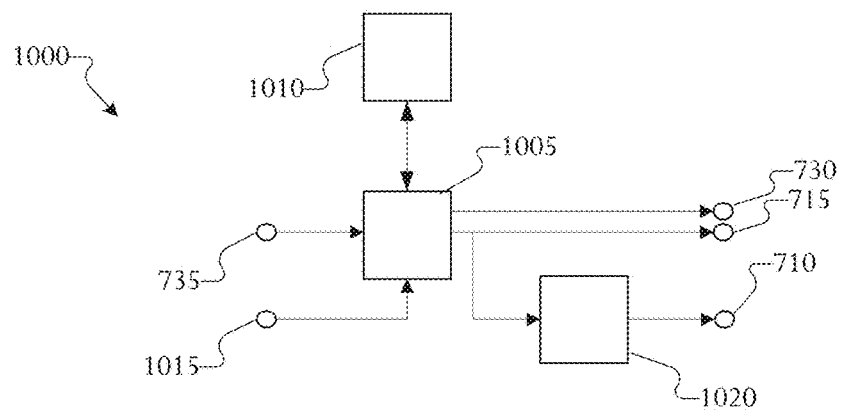
FIG. 10 illustrates an example processing system according to embodiments of the present disclosure.

FIG. 10 illustrates an example processing system according to embodiments of the present disclosure. The embodiment of the processing system 1000 shown in FIG. 10 is for illustration only and other embodiments could be used without departing from the present disclosure. The processing system 1000 can be configured the same as processor 805 or configured to perform the functions of processor 805. For example, the processor 805 can be implemented as a multiple processor system, such as certain embodiments of the processing system 1000.

In certain embodiments, the processing system 1000 includes one or more processors configured as a focal point estimator 1005. In certain embodiments, the processing system 1000 includes a single processor configured to control the operations of a FPES as well as perform the functions of the focal point estimator 1005. The focal point estimator 1005 is configured to estimate a focal point according to one or more of the methods outlined herein above.

In certain embodiments, the processing system 1000 includes a focal point database 1010. The focal point database 1010 can be stored in the memory of the processing system 1000. The processing system 1000 can store captured images in focal point database 1010 as well as pupil and spot detection information. The focal point database 1010 can include a plurality of eye rotation, anterior surface and inner lens curvature data of the user looking at a particular object placed at different positions during a calibration mode. Additionally, the processing system 1000 can retrieve focal point estimation information from the focal point database 1010.

The processing system 1000 is configured to receive data signals from infrared camera 735. The processing system 1000 stores the received data signals in the focal point database 1010 for recall and use in configuring the FPES 700. In certain embodiments, the camera system operates responsive to a user input 1015, such as via a touch input, button, or other control input for measurement (i.e., a measurement button). For example, when a user pushes the measurement button, the FPES changes a display focal point to a user's focal point. The processing system 1000 drives the operation of, such as by issuing command signals, the light source 730 and the lens assembly 715.

The processing system 1000 also includes a display ON/OFF selector 1020. The display ON/OFF selector 1020 drives the operation of, such as by issuing command signals or operating adaptive switch, the OLED display 710. In the example, the display ON/OFF selector 1020 drives the operation of OLED display 710; however, embodiments herein apply equally to the display ON/OFF selector 1020 driving the operation of the display 815. For example, the display ON/OFF selector 1020 can determine a whether a gaze, or focal point, or both, of the eye of the user is at a distance corresponding to a position of the OLED display 710. When the gaze or focal point of the eye of the user corresponds to a near proximity, such as at the distance corresponding to a position of the OLED display 710, the display ON/OFF selector 1020 turns ON the OLED display 710. When the gaze or focal point of the eye of the user does not correspond to a near proximity, the display ON/OFF selector 1020 turns OFF the OLED display 710 (or display 815).

In certain embodiments, the display ON/OFF selector 1020 is configured as a semi-automatic display changer. That is, when a user pushes a button, such as user input 1015, the display ON/OFF selector 1020 turns OFF or ON the OLED display 710.

Figure 12:
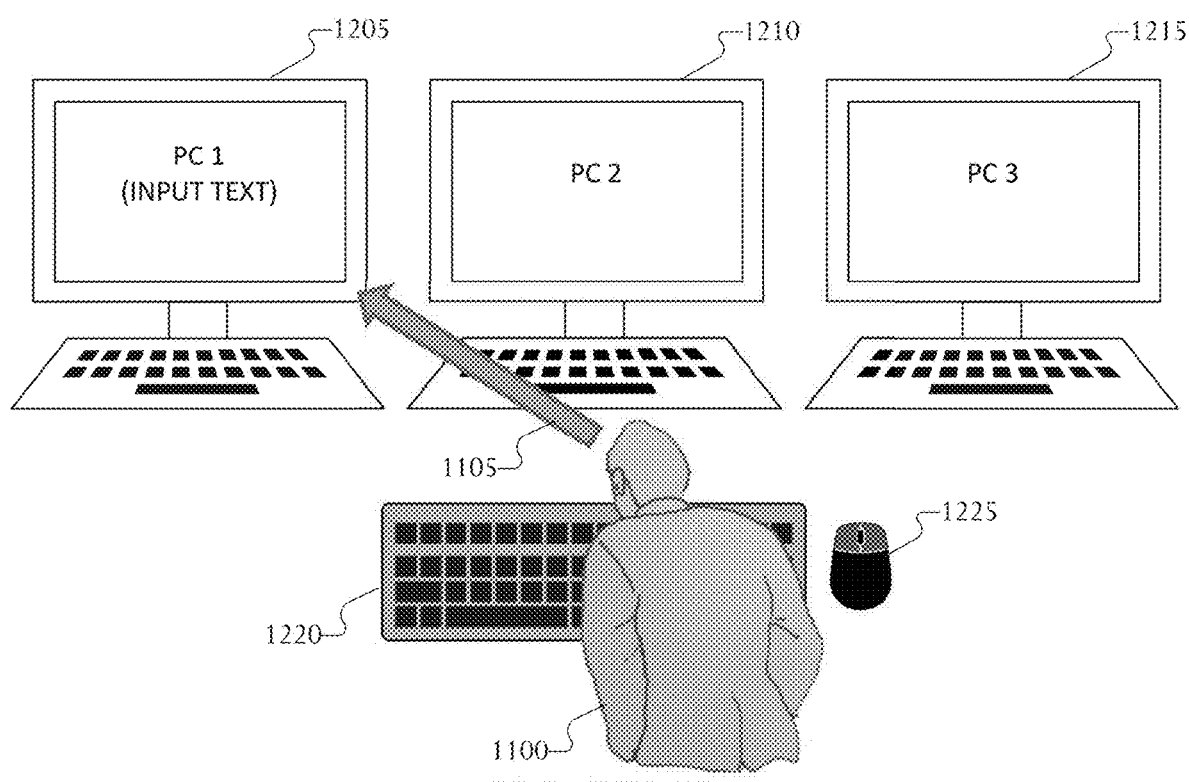
Figure 13:
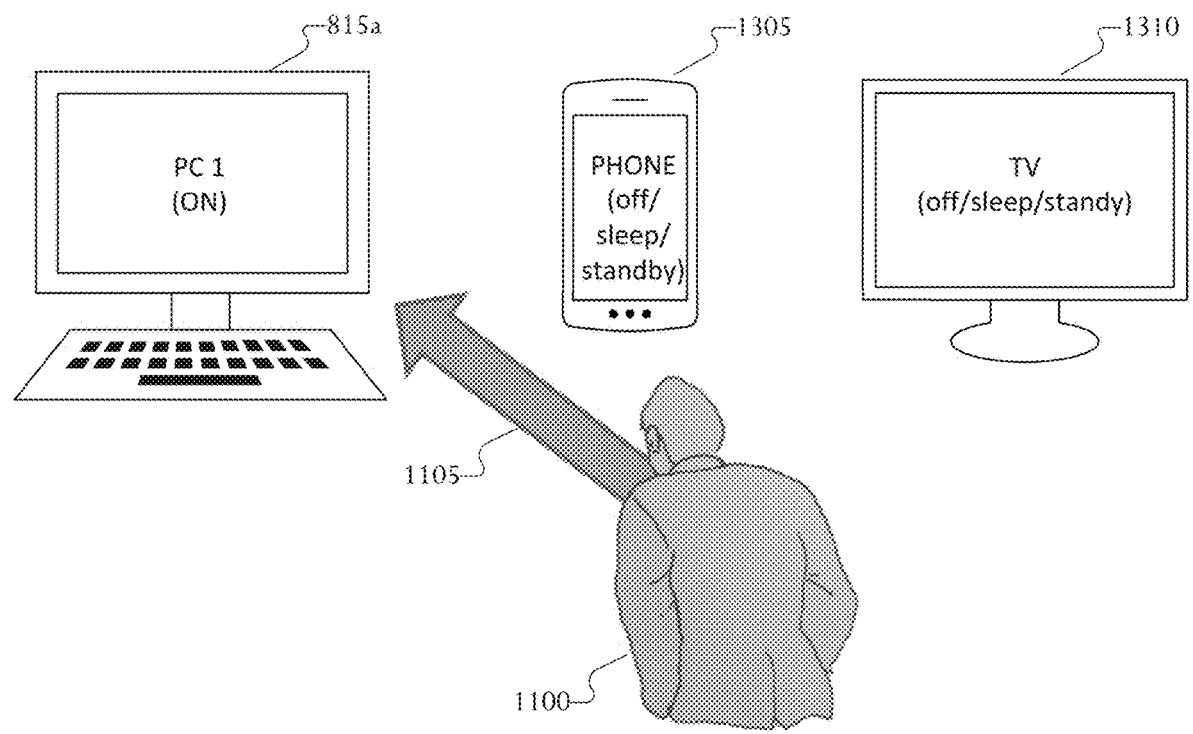

FIGS. 11, 12, and 13 illustrate operation of external devices according to embodiments of the present disclosure. The examples of the control of the external devices shown in FIGS. 11, 12, and 13 are for illustration only and other examples could be used without departing from the scope of the present disclosure.

In the example shown in FIG. 11, a user 1100 is looking at a first display 815*a*. A HMD, such as FPES 700 or electronic device 800, is configured to perform gaze tracking and focal point tracking as described herein. To perform gaze tracking, a determination is made regarding X and Y positions (e.g., horizontal and vertical) of where the user is looking, while to perform focal point tracking, a determination is made regarding the Z position (e.g., depth) of where the user is looking. As such, in some embodiments, the "gaze 1105" can further depend on the focal point tracking (depth information) as well. The HMD determines that the gaze 1105 of the user 1100 is directed at the first display 815*a* and not at the second display 815*b* nor at the third display 815*c*. In response to determining that the gaze 1105 of the user 1100 is upon the first display 815*a*, the HMD automatically operates the first display 815*a* and turns OFF the second display 815*b* and turns OFF the third display 815*c*. That is, without user intervention, the HMD turns ON the first display 815*a* and turns OFF the second display 815*b* and turns OFF the third display 815*c*.

In the example shown in FIG. 12, a user 1100 is looking at a first personal computer (PC) 1205. The user 1100 may desire to input text into the first PC 1205. A HMD, such as FPES 700 or electronic device 800, is configured to perform gaze tracking and focal point tracking as described herein. Again, it is noted that, to perform gaze tracking, a determination is made regarding X and Y positions (e.g., horizontal and vertical) of where the user is looking, while to perform focal point tracking, a determination is made regarding the Z position (e.g., depth) of where the user is looking. As such, in some embodiments, the "gaze 1105" can further depend on the focal point tracking (depth information) as well. The HMD determines that the gaze 1105 of the user 1100 is directed at the first PC 1205 and not at the second PC 1210 nor at the third PC 1215. In response to determining that the gaze 1105 of the user 1100 is upon the first PC 1205, the HMD automatically couples the input device 1220 to the PC 1205 such that text input via the input device 1220, including adjacent mouse 1225, is received, displayed, or executed by the first PC 1205. That is, without user intervention, the HMD turns ON the first PC 1205, couples the first PC 1205 to input device 1220 and mouse 1225, turns OFF the second PC 1210 and turns OFF the third PC 1215.

In the example shown in FIG. 13, a user 1100 is looking at a PC 1205. The user 1100 may desire to operate the PC 1205 or view information on PC 1205. A HMD, such as FPES 700 or electronic device 800, is configured to perform gaze tracking and focal point tracking as described herein. Again, it is noted that, to perform gaze tracking, a determination is made regarding X and Y positions (e.g., horizontal and vertical) of where the user is looking, while to perform focal point tracking, a determination is made regarding the Z position (e.g., depth) of where the user is looking. As such, in some embodiments, the "gaze 1105" can further depend on the focal point tracking (depth information) as well. The HMD determines that the gaze 1105 of the user 1100 is directed at the PC 1205 and not at the phone 1305 nor at the television 1310. In response to determining that the gaze 1105 of the user 1100 is upon the first PC 120, the HMD automatically operates the first PC 1205. That is, without user intervention, the HMD turns ON the first PC 1205. Additionally, the HMD does not engage, turns OFF, or places in a sleep mode, the phone 1305 and the television 1310.

Accordingly, the HMD, such as via an adaptive switch and display ON/OFF selector, is able to vary which external device to operate and which display on the respective external devices to operate. The HMD is able to, in response to determining a gaze 1105 of the user 1100, or focal point of the eye of the user 1100, select one of a number of external devices to operate. Additionally, the HMD is able to, in response to determining a gaze 1105 of the user 1100, or focal point of the eye of the user 1100, turn ON a display of the selected external device and turn OFF the displays of the respective non-selected external devices.

In certain embodiments, the HMD, such as FPES 700 or electronic devices 500, 600 or 800, is configured to provide an eye health awareness notification to the user. Continuous tracking/viewing of objects at extended periods of too-close focus can negatively affect the health of the eye. Ophthalmologists, optometrists and other eye professionals note a seeming link between myopia, also called nearsightedness, and "near work"—visual activities that take place at a distance of about 40 centimeters (16 inches) from the eye—such as reading a book. Staring at a computer screen qualifies as well, though monitors usually are around 50 centimeters (20 inches) away. For example, when a user keeps looking at a near object, or near focal or gaze point, for a long time, an HMD in accordance with the present disclosure can be configured to provide an alert to the user. The HMD can generate the alert via OLED display 710, display 815, or via smartphone 750.

In certain embodiments, the HMD, such as FPES 700, or electronic devices 500, 600 or 800, is configured to generate a human centered Simultaneous Localization and Mapping (SLAM). SLAM is a technology constructing or updating a map of an unknown environment with a camera. The HMD is able to capture private texture, such as faces of people, letters, and symbols. The HMD camera 735 (or cameras 515 or 535) creates SLAM using the focal points of the eye of the user. As such, the HMD camera 735 generates the SLAM images by observing a user, not an outside environment. This method also allows the HMD to focus only on the surfaces to which the user pays attention. This method also allows the HMD to reduce significantly the amount of data, mapping and computation.

Figure 14A:
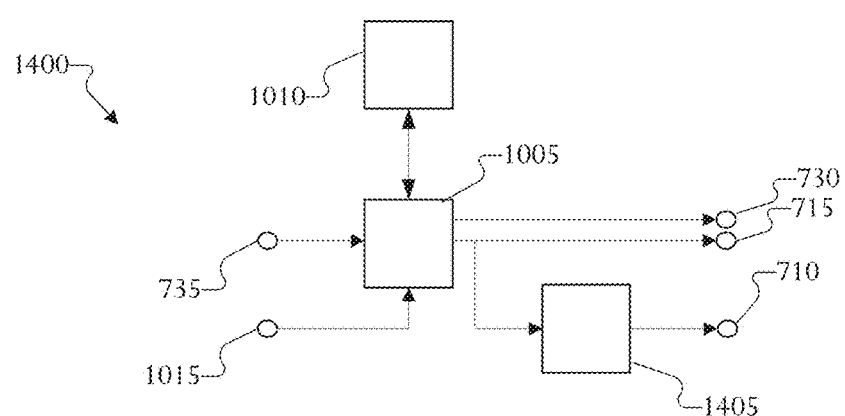
FIG. 14A illustrates a Simultaneous Localization and Mapping (SLAM) system according to embodiments of the present disclosure.

FIG. 14A illustrates a Simultaneous Localization and Mapping (SLAM) system according to embodiments of the present disclosure. The embodiment of the SLAM system 1400 shown in FIG. 14A is for illustration only and other embodiments could be used without departing from the present disclosure. The SLAM system 1400 can be configured the same as processor 805 or configured to perform the functions of processor 805.

SLAM is the computational problem of constructing or updating a map of an unknown environment while simultaneously keeping track of an agent's location within it. SLAM algorithms are tailored to the available resources, hence not aimed at perfection, but at operational compliance. Published approaches of SLAM are employed in self-driving cars, unmanned aerial vehicles, autonomous underwater vehicles, planetary rovers, newer domestic robots and even inside the human body.

The SLAM system 1400 includes an output focal plane, which is a depth where the image of the display is projected. As such, a SLAM system 1400 tracking system is coupled with a display output system. In certain embodiments, the display includes an optical system that adjusts a lens (mechanically, acoustically or electrically). In certain embodiments, the SLAM system 1400 display image may be digitally placed by processing digitally the content to be in focus at a certain distance(s).

The SLAM system 1400 can choose from multiple options regarding where the content is placed in space. For example:

User driven: The SLAM system 1400 can project information at the depth that the user is focusing. The SLAM system 1400 can guide the user to focus in a certain plane by adjusting the focal plane close (but not exactly) to the user focus and keep moving it until the user reaches target depth.

Environment driven: In an augmented reality scenario, the SLAM system 1400 needs to overlay digital content at the depth of the targeted object or plane. The SLAM system 1400 can use the user eye focal point to recognize or calculate where the real object is placed in depth relative to the user.

In certain embodiments, the SLAM system 1400 includes a SLAM generator 1405. The SLAM generator 1405 can be implemented as a single processor or a multiple processor system. In certain embodiments, the SLAM generator 1405 is implemented as part of another processor system. The focal point estimator 1005 is configured to estimate a focal point according to one or more of the methods outlined herein above.

In certain embodiments, the SLAM system 1400 includes a focal point database 1010. The focal point database 1010 can be stored in the memory of the processing system 1000. The SLAM system 1400 can store captured images in focal point database 1010 as well as pupil and spot detection information. The focal point database 1010 can include a plurality of eye rotation, anterior surface and inner lens curvature data of the user looking at a particular object placed at different positions during a calibration mode. Additionally, the SLAM system 1400 can retrieve focal point estimation information from the focal point database 1010.

The SLAM system 1400 is configured to receive data signals from infrared camera 735. The SLAM system 1400 stores the received data signals in the focal point database 1010 for recall and use in configuring the FPES 700. In certain embodiments, the camera system operates responsive to a user input 1015, such as via a touch input, button, or other control input for measurement (i.e., a measurement button). For example, when a user pushes the measurement button, the FPES changes a display focal point to a user's focal point. The SLAM system 1400 drives the operation of, such as by issuing command signals, the light source 730 and the lens assembly 715.

The SLAM system 1400 also includes a display ON/OFF selector 1020. The display ON/OFF selector 1020 drives the operation of, such as by issuing command signals or operating adaptive switch, the OLED display 710. In the example, the display ON/OFF selector 1020 drives the operation of OLED display 710; however, embodiments herein apply equally to the display ON/OFF selector 1020 driving the operation of the display 815. For example, the display ON/OFF selector 1020 can determine a whether a gaze, or focal point, or both, of the eye of the user is at a distance corresponding to a position of the OLED display 710. When the gaze or focal point of the eye of the user corresponds to a near proximity, such as at the distance corresponding to a position of the OLED display 710, the display ON/OFF selector 1020 turns ON the OLED display 710. When the gaze or focal point of the eye of the user does not correspond to a near proximity, the display ON/OFF selector 1020 turns OFF the OLED display 710 (or display 815).

The SLAM generator 1405 uses a data from focal point estimator 1005. In certain embodiments, when a user pushes a button, such as via user input 1015, the SLAM generator 1405 generates a SLAM.

In certain embodiments, the HMD, such as FPES 700, or electronic devices 500, 600 or 800, is configured to generate depth information. Certain embodiments provide an application for a mono-eye person's aid. A mono-eye person is not able to perceive depth information. Certain embodiments of the present disclosure provide depth information on a display. Examples include an overlapped color layer for depth, sound related to depth, and the like. In certain embodiments, a depth information generator uses focal point data. When a user pushes a button, the HMD provides depth information to the user.

Figure 14B:
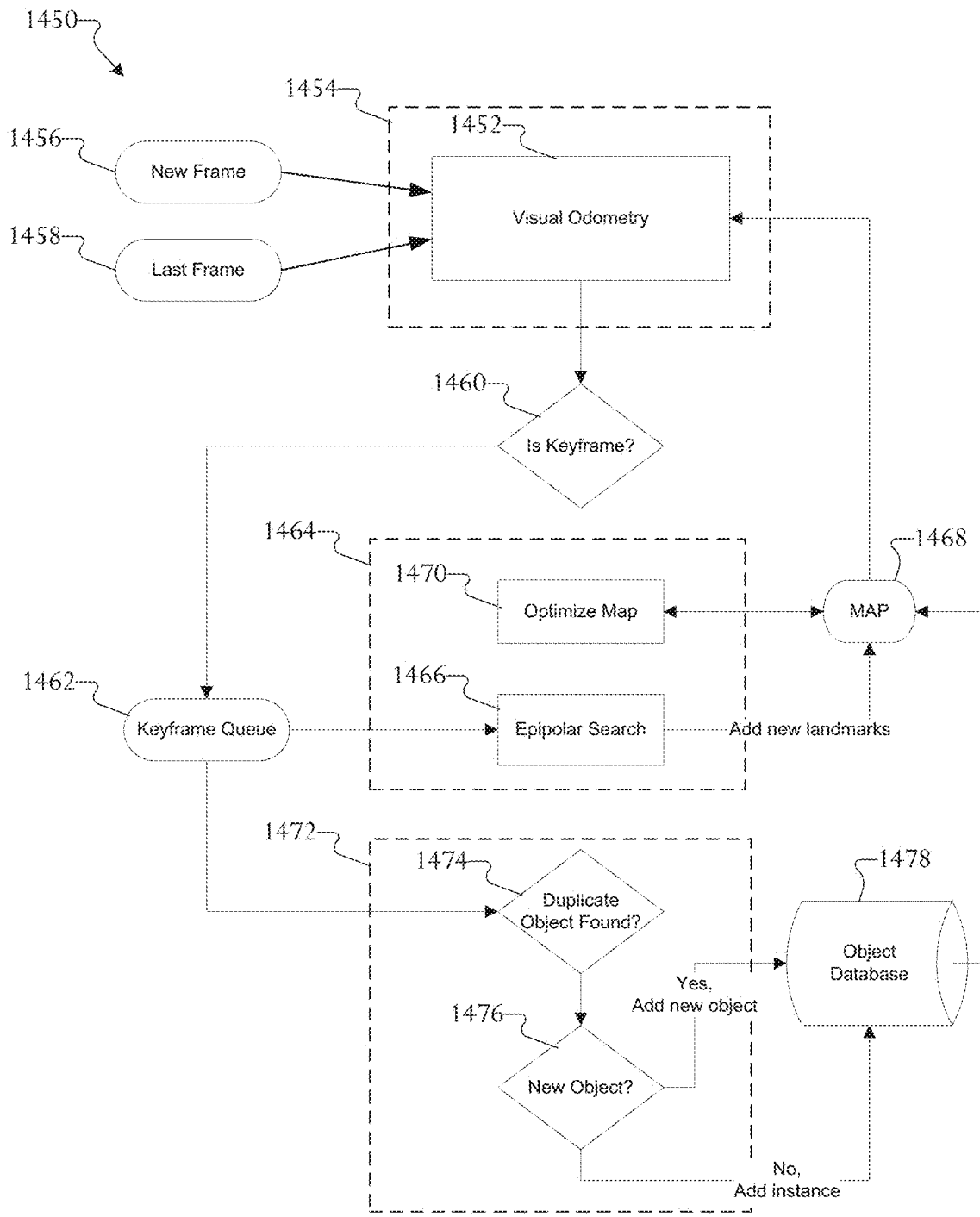
FIG. 14B illustrates a process for Simultaneous Localization and Mapping (SLAM) according to embodiments of the present disclosure.

FIG. 14B illustrates a process for Simultaneous Localization and Mapping (SLAM) according to embodiments of the present disclosure. While the SLAM process 1450 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the SLAM process 1450 is described with respect to the SLAM system 1400 of FIG. 14A. However, the SLAM process 1450 can be used with any other suitable system.

In some instances, embodiments of the present disclosure provide for two depths. A point cloud from SLAM (Depth map) is generated based on the user gaze (x,y or $\theta,\varphi$) and focal point (z or r). This provides a point in the 3D space. This process can be assisted with inertial measurement unit (IMU) data or mapped together with red-green-blue (RGB) camera, black and white (B&W) camera, or the like.

In block 1452, within a tracking thread 1454, to generate depth information, visual odometry is performed. The visual odometry is a process of determining the position and orientation of the system by analyzing the associated camera images, such as a new frame 1456 and a last frame 1458. In block 1460, a keyframe is identified and sent to keyframe queue 1462. In a mapping thread 1464, an epipolar search, in block 1466, is performed on a selected keyframe in which new landmarks may be added. A map 1468 is generated from the output of the epipolar search, in block 1466. The map 1468 is optimized and updated in block 1470. Additionally, in the recognition thread 1472, a determination is made as to whether a duplicate object is found in block 1474. If a duplicate object is found, a determination is made as to whether the duplicate is a new object in block 1476. If the object is new, the object is added to an object database 1478. If the object is not new, an instance is added to the database 1478 regarding the "not new" object. Thereafter, the database 1478 is also used to generate and update the map 1468.

Figure 15:
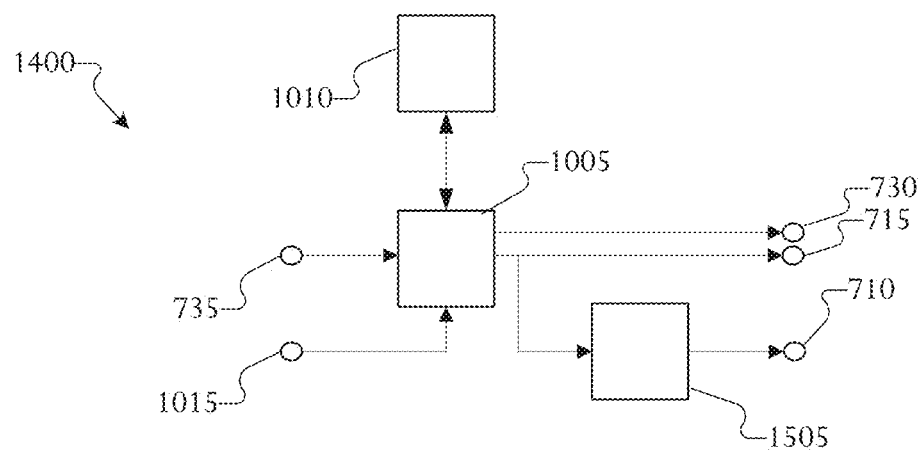
FIG. 15 illustrates a depth information system according to embodiments of the present disclosure.

FIG. 15 illustrates a depth information system according to embodiments of the present disclosure. The embodiment of the depth information system 1500 shown in FIG. 15 is for illustration only and other embodiments could be used without departing from the present disclosure. The depth information system 1500 can be configured the same as processor 805 or configured to perform the functions of processor 805.

In certain embodiments, the depth information system 1500 includes a depth generator 1505. The depth generator 1505 can be implemented as a single processor or a multiple processor system. In certain embodiments, the depth generator 1505 is implemented as part of another processor system. The depth information system 1500 also includes focal point estimator 1005 configured to estimate a focal point according to one or more of the methods outlined herein above.

In certain embodiments, the depth information system 1500 includes a focal point database 1010. The focal point database 1010 can be stored in the memory of the processing system 1000. The depth information system 1500 can store captured images in focal point database 1010 as well as pupil and spot detection information. The focal point database 1010 can include a plurality of eye rotation, anterior surface and inner lens curvature data of the user looking at a particular object placed at different positions during a calibration mode. Additionally, the depth information system 1500 can retrieve focal point estimation information from the focal point database 1010.

The depth information system 1500 is configured to receive data signals from infrared camera 735. The SLAM system 1400 stores the received data signals in the focal point database 1010 for recall and use in configuring the FPES 700. In certain embodiments, the camera system operates responsive to a user input 1015, such as via a touch input, button, or other control input for measurement (i.e., a measurement button). For example, when a user pushes the measurement button, the FPES changes a display focal point to a user's focal point. The depth information system 1500 drives the operation of, such as by issuing command signals, the light source 730 and the lens assembly 715.

The depth generator 1505 generates depth information for display on OLED display 710 or display 815. The depth information can be generated as described herein above with respect to the SLAM in FIGS. 14A and 14B. In certain embodiments, the depth generator 1505 uses a data from focal point estimator 1005. In certain embodiments, when a user pushes a button, such as via user input 1015, the depth generator 1505 generates the depth information. The user inputs can include one or more of: a voice command, an action, a gesture, or blink pattern to trigger the depth aid. For example, the camera 735 can detect a blinking of the eye of the user. In response, the depth generator 1505 generates depth information for display by the OLED display 710 or display 815. For example, processor 725 or processor 805 can cause the depth generator 1505 to generate the depth information. In certain embodiments, the information captured by the camera 735 is detected by the depth generator 1505, which, in response thereto, generates the depth information. Thereafter, the depth information is displayed by the OLED display 710 or display 815.

Figure 16:
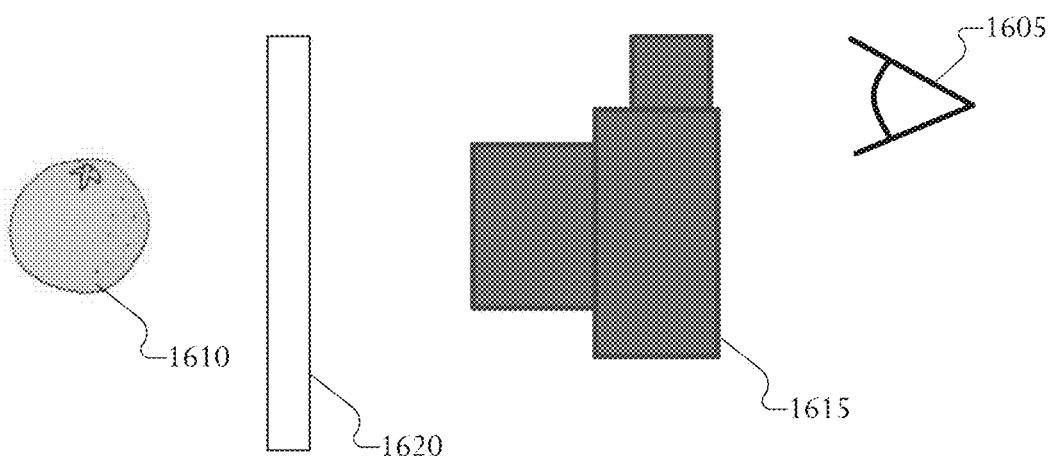
FIG. 16 illustrates a camera focus example according to the present disclosure.

FIG. 16 illustrates a camera focus example according to the present disclosure. The camera focus example shown in FIG. 16 is for illustration only. Other examples could be used without departing from the scope of the present disclosure.

In the example shown in FIG. 16, a user 1605 is trying to capture an image of an object 1610 using camera 1615. The object is on a first side of a glass 1620 and the camera is on the other side of the glass 1620. The user 1605 attempts to set a focal point of camera 1615 through the glass 1620. In some situations, the camera 1615 will focus on glass 1620 while the user 1605 wants to take a picture of the object 1605.

Figure 17:
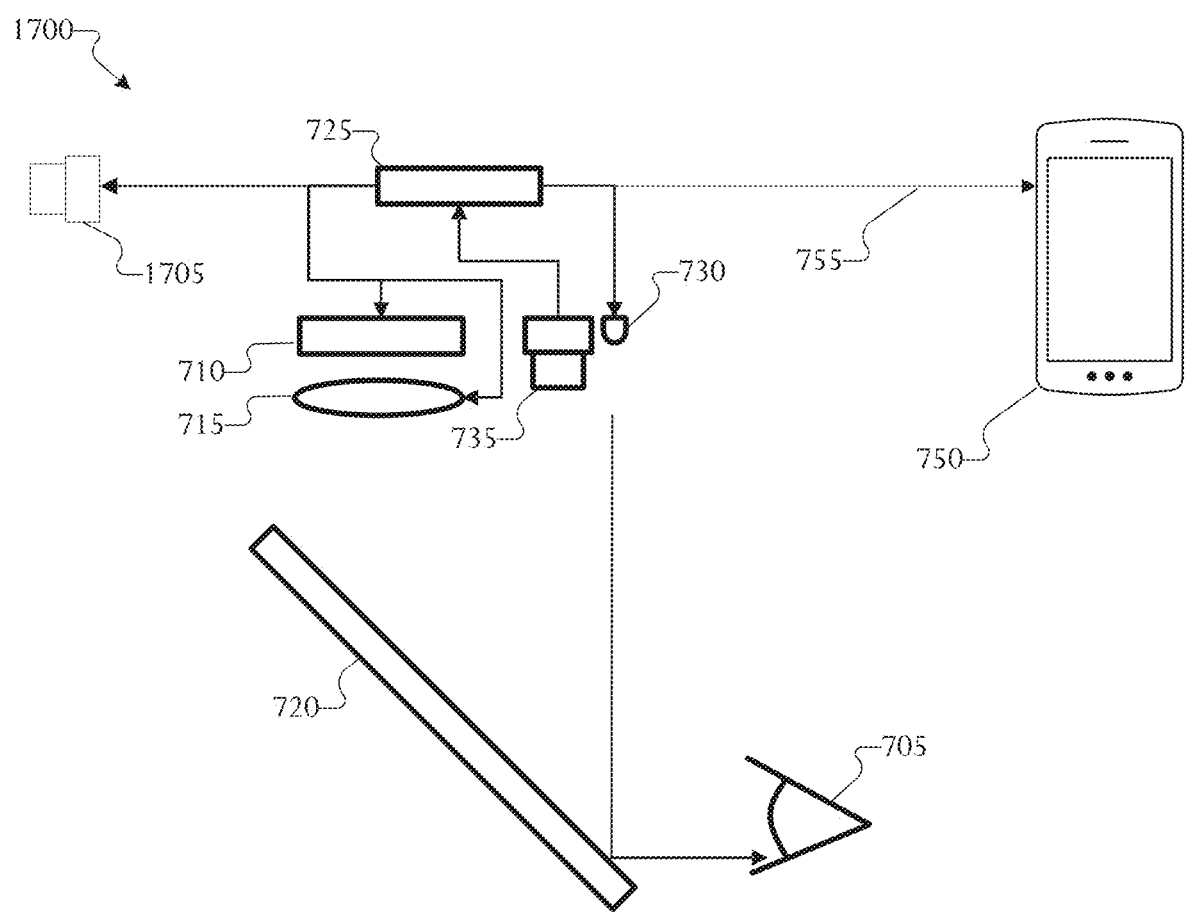
FIG. 17 illustrates a camera assisted focus system according to embodiments of the present disclosure.

FIG. 17 illustrates a camera assisted focus system according to embodiments of the present disclosure. The embodiment of the camera assisted focus system (CAFS) 1700 shown in FIG. 17 is for illustration only. Other embodiments could be used without departing from the scope of the present disclosure. The CAFS 1700 can be configured the same as, or similar to, the FPES700 of FIG. 7.

The CAFS 1700 is positioned in relation to the user's eye 705. The CAFS 1700 is able to emit a light towards the user's eye 705 and detect a reflected light from the user's eye 705. That is, the CAFS 1700 can emit a light towards the user's eye 705 while the user, being a wearer of the HMD, is looking at an object placed in front of the HMD, wherein the reflected light is reflected by anterior surface of eye of the user and inner lens of the eye of the user. The CAFS 1700 includes OLED display 710, a lens assembly 715, a reflective interface 720, a processing system 725, an infrared light source 730, and an infrared camera 735. The CAFS 1700 also includes, or is coupled to, camera 1705.

The OLED display 710 displays images, such as images to augment a reality view of the user when wearing the HMD. In certain embodiments, the OLED display 710 can be integrated into the CAFS 1700, such as when the CAFS 1700 is part of, or comprises, the HMD. In certain embodiments, the OLED display 710 is part of the HMD and interacts with the CAFS 1700. For example, the CAFS 1700 can drive command signals to control an image rendered by the OLED display 710 and the OLED display 710 can render images based on estimations performed by the CAFS 1700. That is, the OLE display is configured to present an image of the object at a 2nd distance based on the focal point of the lens unit to create a perception for the user that the image is placed at the 1st distance.

The lens assembly 715 can include a single lens or a plurality of lenses. The lens assembly 715 can be a part of the OLED display 710 or coupled to the OLED display 710. For example, when the CAFS 1700 is included with the HMD, the lens assembly 715 can be disposed in proximity to or over a display surface of the OLED display 710. In certain embodiments, when the CAFS 1700 is coupled to the HMD, the lens assembly 715 may be included as part of the HMD, may be included as part of the OLED display 710, or may be configured to removably couple to the HMD or OLED display 710, such that the lens assembly 715 is disposed in proximity to or over a display surface of the OLED display 710. The lens assembly 715 is configured to adjust to vary a focal point of the lens assembly 715.

The reflective interface 720 is a transparent, semi-transparent, or opaque material. The reflective interface 720 includes a reflective surface. For example, the reflective interface 720 can be a transparent mirror. In certain embodiments, the reflective interface 720 is integrated as part of the CAFS 1700. In certain embodiments, the reflective interface 720 is part of the HMD to which the CAFS 1700 is coupled. The reflective interface 720 is configured to reflect light from the infrared light source 730 towards the eye 705 and reflect light from the eye 705 towards the infrared camera 735.

The infrared light source 730 emits an infrared light towards the reflective interface 720. The infrared light is emitted at a radiant intensity sufficiently low to be safe for the eye 705. A standard IEC-62471 describes a safe level of infrared's intensity. For example, a radiant intensity of 0.18 watt per steradian (W/sr). In certain embodiments, the infrared light source 730 emits the infrared light at or below 0.18 W/sr. In certain embodiments, the infrared light source 730 emits the infrared light at or below 0.10 W/sr. In certain embodiments, the infrared light source 730 includes a switcher configured to enable the infrared light source 730 to emit the infrared light at or below 0.01 W/sr. It is again noted that the first reflection point PS1 corresponds to light reflected from an anterior (or outer) surface of the cornea; the second reflection point PS2 corresponds to light reflected from an posterior (or inner) surface of the cornea; the third reflection point PS3 corresponds to light reflected from an anterior (or outer) surface of the lens; and the fourth reflection point PS2 corresponds to light reflected from an posterior (or inner) surface of the lens. In certain embodiments, the illuminance of the light source 730 is 100% while the illuminance of PS1 is 2.5% with a magnification of 0.072; the illuminance of PS2 is 0.02% with a magnification of 0.06, the illuminance of PS3 is 0.09% with a magnification of 0.086; and the illuminance of PS4 is 0.09% with a magnification of 0.05. It is further noted that the image at PS4 is inverted (i.e., flipped) from the image at the light source.

The infrared camera 735 is configured to capture an image of the eye 705. The infrared camera 735 can detect light reflected from the eye 705. In certain embodiments, the infrared camera 735 can be, or can include, a light sensor configured to detect a reflected light. The reflected light can be reflected by anterior surface of eye of the user and inner lens of the eye of the user. The reflected light can be further reflected by reflective interface 720. The infrared camera 735 transmits signals corresponding to the detected or captures images to the processing system 725.

The processing system 725 can include one or more processors configured to control operations of the CAFS 1700, the HMD, or a combination thereof. The processing system 725 can include a memory to store instructions for operating the processing system 725, operating the CAFS 1700, operating the HMD, or a combination thereof. The memory also can store data captured by the CAFS 1700, such as via the infrared camera 735. The processing system 725 receives signals from the infrared camera 735 corresponding to the images of the eye 705. The processing system 725 analyzes a reflected light pattern on the eye 705 and estimates a corresponding focal point for the eye 705. For example, the processing system 725 can estimate a focal point of the eye 705 using a Purkinje-Sanson Image estimation method. The processing system 725 analyzes a reflection pattern in the image of the eye 705 as captured by infrared camera 735. The processing system 725 identifies reflection points corresponding to the reflection point PS1, the second reflection point PS2, the third reflection point PS3 and the fourth, inverted reflection point PS4. It is again noted that the first reflection point PS1 corresponds to light reflected from an anterior (or outer) surface of the cornea; the second reflection point PS2 corresponds to light reflected from an posterior (or inner) surface of the cornea; the third reflection point PS3 corresponds to light reflected from an anterior (or outer) surface of the lens; and the fourth reflection point PS2 corresponds to light reflected from an posterior (or inner) surface of the lens. The processing system 725 calculates, measures, or otherwise determines a distance between PS1 and PS3. The measurements vary based on eye rotation and anterior surface curvature of the eye of the user and the inner lens of the eye of the user while the user is looking at the object. Based on the distance determination, the processing system 725 adjusts a focal point of the lens assembly 715. As such, the processing system 725 is configured to adjust the focal point of the lens unit in response to a 1st distance of the object from the HMD, wherein the 1st distance is determined based on position of the reflected light.

In response to the adjustment of the focal point of the lens assembly 715, the OLED display 710 is able to present an image of an object at a second distance based on the focal point of the lens assembly 715. Therefore, the CAFS 1700 is able to create a perception for the user that the image is at a first distance, which is different than the second distance.

In certain embodiments, the CAFS 1700 is configured to adjust for different interpupillary distance (IPD). The CAFS 1700 can automatically, i.e., without user intervention, mechanically move an illumination LED using camera feedback loop to initially adjust and track user changes in HMD positioning during use and to adjust for different eye positions for different users. The CAFS 1700 can automatically, i.e., without user intervention, mechanically move the half-mirror (reflective interface 720), using camera feedback loop to initially adjust and track user changes in HMD positioning during use and to adjust for different eye positions for different users. In certain embodiments, the CAFS 1700 includes a Multi-LED: array (1D) or matrix (2D). The CAFS 1700 can perform feedback loop testing of different LED's and camera tracking of PS3 635. The CAFS 1700 can perform feedback loop optimization for once it is locked at the optimal LED can skip the loop or just track neighbor LEDs. In certain embodiments, the CAFS 1700 is configured to initially calibrate to a respective user and, thereafter, adjust a focal point based on user eye movements and adjustments in focus. In certain embodiments, the CAFS 1700 is configured to recalibrate in response to HMD movements of the user.

In certain embodiments, the CAFS 1700 is configured to communicate with an external device. For example, the CAFS 1700 can be connected to a smartphone 750 to provide focal point estimation or gaze point tracking in conjunction with functionality in the smartphone 750. The CAFS 1700 can provide notifications, graphs or data, or health monitoring information 755 to the user via the smartphone 750.

In certain embodiments of the present disclosure, a focal point of the CAFS 1700 is assisted by the camera 1705. The camera 1705 can be a visible ray camera. The camera 1705 is able to emit a visible ray upon an object enabling the user and the CAFS 1700 to focus at the focal point of the object.

Figure 18:
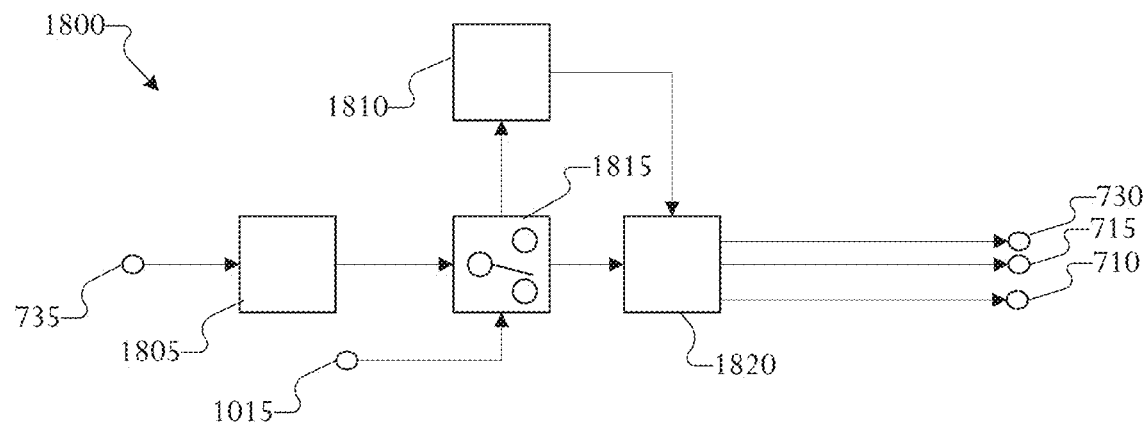
FIG. 18 illustrates a semi-automatic user lens power estimator according to the present disclosure.

FIG. 18 illustrates a semi-automatic user lens power estimator according to the present disclosure. The semi-automatic user lens power estimator 1800 shown in FIG. 18 is for illustration only. Other examples could be used without departing from the scope of the present disclosure. The semi-automatic user lens power estimator 1800 can be included in an HMD as described herein, such as being part of FPES 700, electronic device 600, electronic device 800, of CAFS 1700.

In certain embodiments, the HMD includes a mobile eye-lens power estimator 1800. The semi-automatic user lens power estimator 1800 can obtain not only user's lens power but also obtain a degradation over time if a user is always wearing this device. The semi-automatic user lens power estimator 1800 includes a light analyzer 1805, a database 1810, a selector 1815 and a focal point estimator 1820. The light analyzer 1805 determines an amount of light emitted by the HMD and compares the determined light value to values in database 1810. In certain embodiments, the light analyzer 1805 operates in response to a user input via input 1015.

Figure 19:
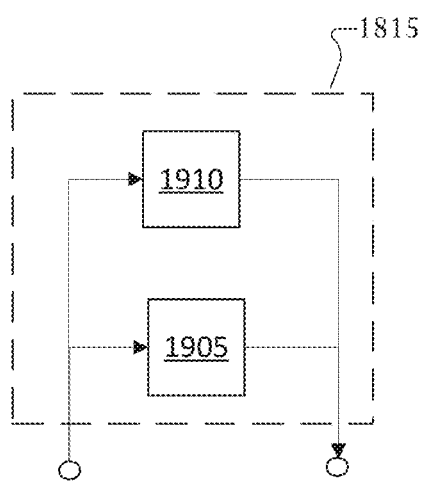
FIG. 19 illustrates an adaptive selector according to embodiments of the present disclosure.

FIG. 19 illustrates an adaptive selector according to embodiments of the present disclosure. adaptive selector 1815 shown in FIG. 19 is for illustration only. Other examples could be used without departing from the scope of the present disclosure.

In certain embodiments, the adaptive selector 1815 includes an eye motion database 1905 and a reflected light database 1910. The adaptive selector 1815 can compare values detected regarding the user's eye to values stored in the eye motion database 1905 and the reflected light database 1910 to determine if degradation of the HMD display has occurred.

Certain embodiments of the present disclosure provide enhanced driver safety. Although embodiments of the present disclosure are not limited to self-driving, recently there has been an increase interest in self-driving cars. The self-driving cars still require operator attention and operator supervision. For example, TESLA vehicles require an operator to maintain their hands on the steering wheel to try to ensure operator attention on the road. Embodiments of the present disclosure provide for tracking of the focal point of the operator. Tracking the user focal point is key to distinguish lack of attention to the road. Near focal point means the driver is focusing on the inside of the vehicle, such as when interacting with the entertainment system, checking the phone, and the like. Embodiments of the present disclosure can determine whether the driver's focus is on objects within the vehicle or on objects outside the vehicle. In certain embodiments, the electronic device is able to detect a speed of the vehicle, uses surrounding sensors to determine motion and proximity to objects and vehicle lanes, and uses a focal point estimator to determine the operator's focal point.

Although various features have been shown in the figures and described above, various changes may be made to the figures. For example, the size, shape, arrangement, and layout of components shown in FIGS. 1 through 8, 10, 14, 15, 17, 18, and 19 are for illustration only. Each component could have any suitable size, shape, and dimensions, and multiple components could have any suitable arrangement and layout. Also, various components in FIGS. 1 through 8, 10, 14, 15, 17, 18, and 19 could be combined, further subdivided, or omitted and additional components could be added according to particular needs. Further, each component in a device or system could be implemented using any suitable structure(s) for performing the described function(s). In addition, while FIG. 8 illustrates various series of steps, various steps in FIG. 8 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
 a processor configured to:
  determine a gaze of a user and a focal point of an eye of the user, and
  based on information associated with at least one of: the gaze of the user or the focal point of the eye of the user, control an operation of the electronic device and a focal point of an adjustable lens; and
 a display screen, coupled to the processor, configured to present an image of an object based on at least one of the gaze of the user or the focal point of the eye, wherein the processor is configured to vary a focus of the object presented on the display screen based on the focal point of the eye.

2. The electronic device of claim 1, wherein the processor is configured to operate the display screen as a function of the focal point of the user such that, when the focal point of the user is near, the processor turns-on the display screen, and when the focal point of the user is far, the processor turns-off the display screen.

3. The electronic device of claim 1, further comprising an adaptive switch configured to select at least one of two or more input devices as a function of the gaze of the user.

4. The electronic device of claim 1, wherein the processor is configured to vary operation of an external device based on the gaze of the user.

5. The electronic device of claim 1, wherein the processor is configured to provide an alert to the user based on a determination that the gaze of the user or the focal point of the user is maintained over a threshold period of time.

6. The electronic device of claim 1, wherein the processor is configured to create a simultaneous localization and mapping (SLAM) image as a function of a plurality of focal points of the eye.

7. The electronic device of claim 1, wherein the processor is configured to generate and display depth information via a monocular display.

8. The electronic device of claim 1, wherein the processor is configured to provide one or more indicators via the display screen, the one or more indicators configured to provide a notification regarding a health concern for a user of the electronic device.

9. A method comprising:
 determining, by an electronic device, a gaze of a user and a focal point of an eye of the user;
 based on information associated with at least one of: the gaze of the user or the focal point of the eye of the user, controlling, by the electronic device, an operation of the electronic device and a focal point of an adjustable lens;
 presenting, by a display screen of the electronic device, an image of an object based on at least one of the gaze of the user or the focal point of the eye; and
 varying a focus of the object presented on the display screen based on the focal point of the eye.

10. The method of claim 9, further comprising operating the display screen as a function of the focal point of the user such that, when the focal point of the user is near, the processor turns-on the display screen, and when the focal point of the user is far, the processor turns-off the display screen.

11. The method of claim 9, further comprising selecting, by an adaptive switch, at least one of two or more input devices as a function of the gaze of the user.

12. The method of claim 9, further comprising varying operation of an external device based on the gaze of the user.

13. The method of claim 9, further comprising providing an alert to the user based on a determination that the gaze of the user or the focal point of the user is maintained over a threshold period of time.

14. The method of claim 9, further comprising creating a simultaneous localization and mapping (SLAM) image as a function of a plurality of focal points of the eye.

15. The method of claim 9, further comprising generating and displaying depth information via a monocular display.

16. The method of claim 9, further comprising providing one or more indicators via the display screen, the one or more indicators configured to provide a notification regarding a health concern for a user of the electronic device.

17. A non-transitory computer readable medium configured to store a plurality of instructions that, when executed by at least one processor, are configured to cause the at least one processor to:
   determining a gaze of a user and a focal point of an eye of the user;
   based on information associated with at least one of: the gaze of the user or the focal point of the eye of the user, control an operation of an electronic device and a focal point of an adjustable lens; and
   control a display screen to present an image of an object based on at least one of the gaze of the user or the focal point of the eye, wherein the instructions further are configured to cause the processor to vary a focus of the object presented on the display screen based on the focal point of the eye.

18. The non-transitory computer readable medium of claim 17, wherein the plurality of instructions is further configured to cause the at least one processor to operate the display screen as a function of the focal point of the user such that, when the focal point of the user is near, the processor turns-on the display screen, and when the focal point of the user is far, the processor turns-off the display screen.

19. The non-transitory computer readable medium of claim 17, wherein the plurality of instructions is further configured to cause at least one of an adaptive switch or the at least one processor to select at least one of two or more input devices as a function of the gaze of the user.

20. The non-transitory computer readable medium of claim 17, wherein the plurality of instructions is further configured to cause the at least one processor to vary operation of an external device based on the gaze of the user.

21. The non-transitory computer readable medium of claim 17, wherein the plurality of instructions is further configured to cause the at least one processor to provide an alert to the user based on a determination that the gaze of the user or the focal point of the user is maintained over a threshold period of time.

22. The non-transitory computer readable medium of claim 17, wherein the plurality of instructions is further configured to cause the at least one processor to create a simultaneous localization and mapping (SLAM) image as a function of a plurality of focal points of the eye.

23. The non-transitory computer readable medium of claim 17, wherein the plurality of instructions is further configured to cause the at least one processor to generate and display depth information via a monocular display.

24. The non-transitory computer readable medium of claim 17, wherein the plurality of instructions is further configured to cause the at least one processor to provide one or more indicators via the display screen, the one or more indicators configured to provide a notification regarding a health concern for a user of the electronic device.

\* \* \* \* \*